United States Patent [19]

Miner et al.

[11] Patent Number: 4,874,164

[45] Date of Patent: Oct. 17, 1989

[54] PERSONAL COMPUTER APPARATUS FOR BLOCK TRANSFER OF BIT-MAPPED IMAGE DATA

[75] Inventors: Jay G. Miner, Mtn. View; Dave Dean, Ukiah; Joseph C. Decuir, Albany; Ronald H. Nicholson, Sunnyvale; Akio Tanaka, Burlingame, all of

[73] Assignee: Commodore-Amiga, Inc., Los Gatos, Calif.

[21] Appl. No.: 886,796

[22] Filed: Jul. 18, 1986

[51] Int. Cl.$^4$ ................................................ A63F 9/22
[52] U.S. Cl. ............................ 273/1 E; 273/DIG. 28; 340/720
[58] Field of Search ............ 273/1 E, DIG. 28, 85 G; 340/720–725

[56] References Cited

U.S. PATENT DOCUMENTS

| | | |
|---|---|---|
| 4,126,893 | 11/1978 | Cronshaw et al. . |
| 4,296,476 | 10/1981 | Mayer et al. . |
| 4,435,776 | 3/1984 | Ratcliffe et al. . |
| 4,445,187 | 4/1984 | Best . |
| 4,509,043 | 4/1985 | Mossaides ............................ 340/721 |
| 4,570,217 | 2/1986 | Allen et al. ........................... 364/900 |

OTHER PUBLICATIONS

"Amiga: The Message is the Medium," Creative Computing, vol. 11, No. 9, pp. 32–41 by John J. Anderson, Sep. 1985.

"What Makes It So Great?" Creative Computing, vol. 11, No. 9, pp. 34–40, by Sheldon Leemon, Sep. 1985.

Primary Examiner—Maryann Lastova
Attorney, Agent, or Firm—Finnegan, Henderson, Farabow, Garrett & Dunner

[57] ABSTRACT

A computer that provides data to a video display using a bitmap display memory organization and bitplane addressing. Separate control is provided for two bitplane backgrounds and for eight reusable and easily movable sprites. Additional logic allows for dynamically-controllable interobject priority and collision detection among data in each of the bitplane backgrounds and sprites. A coprocessor provides for video beam-synchronized changes to data in registers, freeing the main processor for general purpose computing tasks. A block image transfer is provided to rapidly copy data in large blocks from one memory location to another. In hold-and-modify mode, color output circuitry holds the value for a previously displayed pixel while bitplane data modifies those values, allowing for simultaneous display of a greatly increased number of colors.

32 Claims, 4 Drawing Sheets

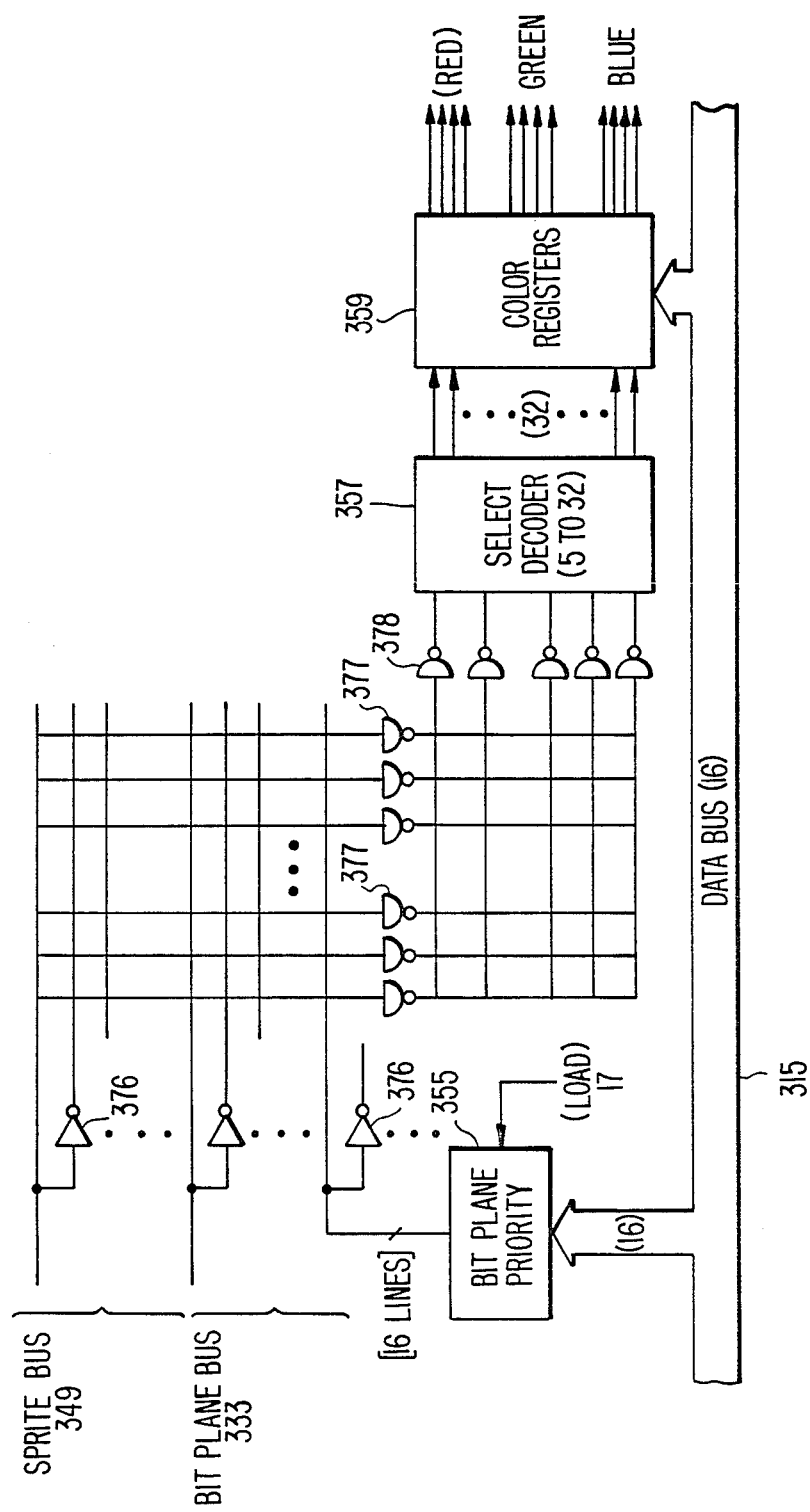

PERSONAL COMPUTER APPARATUS FOR BLOCK TRANSFER OF BIT-MAPPED IMAGE DATA

BACKGROUND OF THE INVENTION

This invention relates to the field of microprocessor powered computers for video games and personal computers, incorporating DMA techniques, especially such systems which are implemented in MOS (metal oxide semiconductor) LSI (large scale integrated) circuitry where circuit area is a consideration. The invention further relates to enhanced systems where auxiliary circuitry has been added to the host system; where a television-type display device is used; and where bit map mode (at least one bit of video information is stored in memory for every element location (pixel) of the picture displayed) is likewise incorporated.

The invention also relates to video display drives for color video display monitors where color sprites (which are sometimes Bit mapping, while space and time implementation consuming, has proven to be a straightforward and an accurate method for video display generation. Complex displays provided by video games and personal computers require overlay presentations of movable and/or changeable information and of fixed information; and of collisions between movable objects. Bit map implementation has been the focus of various prior circuits.

Prior video game circuits have provided a complex display format to a television receiver display unit (a cathode ray tube), which display unit generates the presentation with a plurality of horizontal scans or raster lines. A video game circuit which is capable of displaying fixed objects as background, as well as moving objects, is shown by Rosenthal, U.S. Pat. No. 4,053,740.

Rosenthal has built a special purpose digital computer to generate video game information from a plurality of selected, on a mutually exclusive basis, software defined programs. Operator commands are separated into an independent computational section and an independent display section of the circuit for processing. Rosenthal, U.S. Pat. No. 4,053,740, utilized arithmetic logic units to drive accumulators to control x and y registers and associated horizontal and vertical beam direction drive circuits for cathode ray tube displays.

Personal computers, such as the Apple Computer, have utilized a main microprocessor to perform computational operations and to process (retrieve) video display information to generate displays to a television-type receiver.

The Apple Computer has incorporated a general purpose microprocessor, the MOS Technology Inc. Model 6502, to perform both computational operations and video display information retrieval. Such a single microprocessor driven system has speed limitations, as most microprocessors, including the Model 6502, have significant processing dead time used for refreshing registers and resetting and initializing operations. As a result, information processing in such systems can be slow.

In order to enhance processing speeds these small microprocessor driven computers have sacrificed display quality, i.e., "definition", "character" and "detail."

One approach to increasing the speed of such a personal computer has been to utilize two processors; a Motorola Inc. 68000 and a 6502. In this system, the first processor is dedicated to computational operations and the second microprocessor is dedicated to video display information retrieval.

Other early game circuits, such as Dash et al., U.S. Pat. No. 4,034,983 utilized special purpose control circuits to generate signals to the antenna connection of a commercial color television receiver. Such a special purpose control circuit could include analog interface circuits for processing game-paddle signals and decoding functions, and sync pulse generation could be used to generate horizontal sync and raster scan information.

Personal computer and microprocessor driven systems, such as Chung, U.S. Pat. No. 4,177,462, have used display generator circuitry driven off of an address bus, data bus and control bus, including raster line generation and vertical position counters.

Likewise, Sukonick et al., U.S. Pat. No. 4,070,710 discloses incorporating video control circuits and raster memory access into a system with data and address bus architecture. Sukonick et al. discloses a video control circuit which relies upon a plurality of vertical and horizontal position registers, a skip pattern memory and modulo comparison circuitry for "FIFO" processing of video information.

Sukonick et al., U.S. Pat. No. 4,070,710, shows a two processor system. Sukonick et al. has added a display system 16 to his programmed host computer 10. This video display system 16 contains an Intel Corporation 8088 microprocessor 76 within the micro-control unit of the video display system.

Along this line Burson, U.S. Pat. No. 4,180,805, has provided a video display circuit which incorporates a general purpose microprocessor 15, the TMS 1100 microcomputer. A character memory is provided separate from a display memory and character generator memory. Each display memory word is partitioned into two bytes, with the first byte being a character memory address and the second of which being a sub-address to locate a character-word within a set of character words in memory. Each character memory word is likewise partitioned into two bytes with the first byte determining color and the second byte selecting a particular character from a prestored set.

The use of a second general purpose commercially available microcomputer to process video display information, while increasing the system speed, also increases the cost of manufacture for the system, as well as the size of the system, i.e., chip "real estate."

A micro control unit is also used and is necessary to the circuitry. The micro-control unit decodes instructions from a host computer for use by the raster memory unit and generates (encodes) control information to cause the raster memory to write display information, as well as to control the video control circuit to read information from the raster memory and to translate it into video signals usable by a CRT drive circuit. Ackley et al., U.S. Pat. No. 4,243,984, show a video display processor including general circuit components for overlay control, priority selection, sequence control, and memory control of sprite position and color.

Rahman, U.S. Pat. No. 4,420,770, shows a video background generation system including field correction logic, priority encoder circuitry and horizontal and vertical bit map memory.

Others have developed display circuits which have included an address bus, data bus, and control signal lines for interfacing with a microprocessor based computer system. Some display circuits have included DMA control and playfield and sprite-generator components utilizing a plurality of control registers connected to operate with a plurality of memories, including collision detection and display priority logic.

Dual commercial microprocessor systems have increased off-chip wire connections as each commercial circuit comes as a separate dual-in-line package (DIP). In LSI (large scale integration) circuit design, this increases backplane and circuit card costs and increases the likelihood of noise pickup, often necessitating additional filtering and increased signal levels, which usually leads to more power consumption. Except in the very expensive dual microprocessor systems—priced above the personal computer market—display quality is not greatly enhanced with these second microprocessors as noise pickup and filtering costs often dictate a lesser display output quality.

Others have taken a divergent and different approach, such as using a display generator circuit designed as a raster scan line buffer structure. In such an approach, a general microprocessor can be used to address display object storage random access memory (RAM). The circuitry divides the display into moving objects (sprites) and into stationary objects (playfields). This approach, while cheaper to implement than the dual microprocessor approaches discussed above, and using less chip geometry and inter-chip wiring, does provide degraded system performance and display capabilities compared with the dual microprocessor systems.

One specific display generator enhanced microprocessor based system is shown by Hogan et al., U.S. Pat. No. 3,996,585, where a display generator is implemented with a plurality of buffer registers. He uses this display generator to process bit map information obtained from random access memory (RAM). A pattern generator is used to decode data for each raster scan line. Decoded rastor line data is stored in a buffer register for display. The pattern generator also decodes control data to determine collisons. The decoded collison control data is stored in a buffer register. Hogan et al.'s circuit is intended to relieve the system microprocessor from simple video display data retrieval and manipulation.

In keeping with the display generator circuit approach of Hogan et al., others have built a decoder based video display generators. Such a circuit would not utilize a second general purpose microprocessor to drive a video generator, but may use display instruction decoder circuits to provide movable object and stationary playfield object information to the video display, thereby reducing the work on the only (general purpose) microprocessor present. Any of these circuits, as with Hogan et al., require an increase in memory or storage space which is satisfied by a large number of registers. Some video display generators have their circuitry divided into a decoder(s), RAM(S) and register(s) for handling playfield fixed-object data; and into a decoder-selector(s) and register(s) for handling moving object data.

It is desirable to provide an auxiliary circuit which is intended to be incorporated into a microprocessor based personal computer system, which auxiliary circuit has true microprocessor capabilities, including bit-map data manipulation capabilities, but does not use the space and power of a second microprocessor on the increase in memory needed by the decoder approach, and which can be implemented where inter-chip and backplane wiring is minimized.

SUMMARY OF THE INVENTION

The Amiga personal computer is a low-cost high performance computer with advanced graphics features. It is an object of the invention to provide a high resolution color display, fast graphics for simulation and animation, and substantial processing power at low cost.

High resolution color displays are becoming increasingly common because of the continued dramatic decreases in the cost of memory. However, the resulting huge display buffer memory can be painfully slow to draw or move display images around in, especially when using only a single conventional microprocessor. This situation is worsened by other large memory transfer channels, such as multi-channel stereo sound, high speed line buffer objects (such as sprites), and full track floppy disk buffers, which compete with the display for memory bus time. The conflicting design goals of high resolution color, fast moving displays, and low production cost have been largely resolved by the features of the invention. The hardware solutions are made less costly by designing them on custom silicon chips.

Extensive use is made of Direct Memory Access channels, to relieve the main microprocessor of most of the data transfers and beam position checking peculiar to windowed, real time, dynamic displays. The Motorola 68000 is used as the main microprocessor. The performance of the 68000 is enhanced by a system design that gives it every alternate bus cycle, allowing it to run at full rated speed most of the time. The special functions described below are produced using two custom-designed VLSI circuits, which work in concert with the 68000 to use the shared memory on a fully interleaved basis. Since the 68000 only needs to access the memory bus during each alternate clock cycle in order to run full-speed, the rest of the time the memory bus is free for other activities. A coprocessor and a data-moving DMA channel called the blitter can each steal time from the 68000 for jobs they can do faster than the 68000. Thus, the system DMA channels are designed with maximum performance in mind: the task is performed by the most efficient hardware element available.

A custom display coprocessor allows for changes to most of the special-purpose registers in synchronization with the position of the video beam. This allows such special effects as mid-screen changes to the color palette, splitting the screen into multiple horizontal slices, each having different video resolutions and color depths, and beam-synchronized interrupt generation for the 68000. The coprocessor can trigger many times per screen, in the middle of lines as well as during blanking intervals. The coprocessor itself can directly affect most of the registers of the special-purpose hardware, freeing the 68000 for general-purpose computing tasks.

Thirty-two system color registers are provided, each of which contains a 12-bit number as four bits of red, four bits of green, and four bits of blue intensity information. This allows a system color palette of 4,096 different choices of color for each register. A bitmap display memory organization called bitplane addressing is used. This method groups bitplanes (instead of pixels) together in memory, allows variability in the number and grouping of biplanes into separate images, and allows increased speed when using reduced numbers of bitplanes.

Eight reusable 16-bit-wide sprites are incorporated into the hardware with up to 15 color choices per sprite pixel (when sprites are paired). A sprite is an easily movable graphics object whose display is entirely independent of the background (called a playfield). Sprites can be displayed "over" or "under" this background. After producing the last line of a sprite on the screen, a sprite DMA (direct memory access) channel may be reused to produce yet another sprite image elsewhere on-screen (with at least one horizontal line between each reuse of a sprite processor).

Additional logic allows for dynamically-controllable inter-object priority, with collision detection. The system can dynamically control the video priority between the sprite objects and the bit-plane backgrounds (playfields), and system hardware can be used to detect collisions between objects so that a program can react to such collisions.

The Blitter is used for high speed data movement, adaptable to bitplane animation. The Blitter efficiently retrieves data from up to three sources, combines the data in one of 256 different possible ways, and optionally stores the combined data in a destination area. The blitter can draw patterned lines into rectangularly organized memory regions at a speed of about 1 million dots per second; and it can efficiently handle area fill.

Additional objects and advantages of the invention will be apparent to those skilled in the art from a reading of the following description.

BRIEF DESCRIPTION OF THE DRAWINGS

The present invention will be better understood from a reading of the following detailed description of the preferred embodiment in conjunction with the accompanying drawings, in which:

FIG. 13 is a diagram of the display priority control logic.

DETAILED DESCRIPTION OF THE PREFERRED EMBODIMENT

The Amiga personal computer is a low cost, high performance graphics and sound system for state of the art video game and personal computer applications. The system includes three custom IC's controlled by a Motorola 68000 16/32 bit microprocessor. These chips provide extraordinary color graphics on a standard TV or on an RGB color monitor, with arcade quality resolution and depth to display video games, cartoons, low resolution photographs, or up to 80 characters of text on the screen. The sound circuits can duplicate complex waveforms on each of four channels, matching commercial synthesizers in quality. Chip costs were kept low by using conservative design rules, process specifications, and logic density. The process selected is a common silicon gate NMOS one that is supported by almost all MOS manufacturers.

Figure 8:
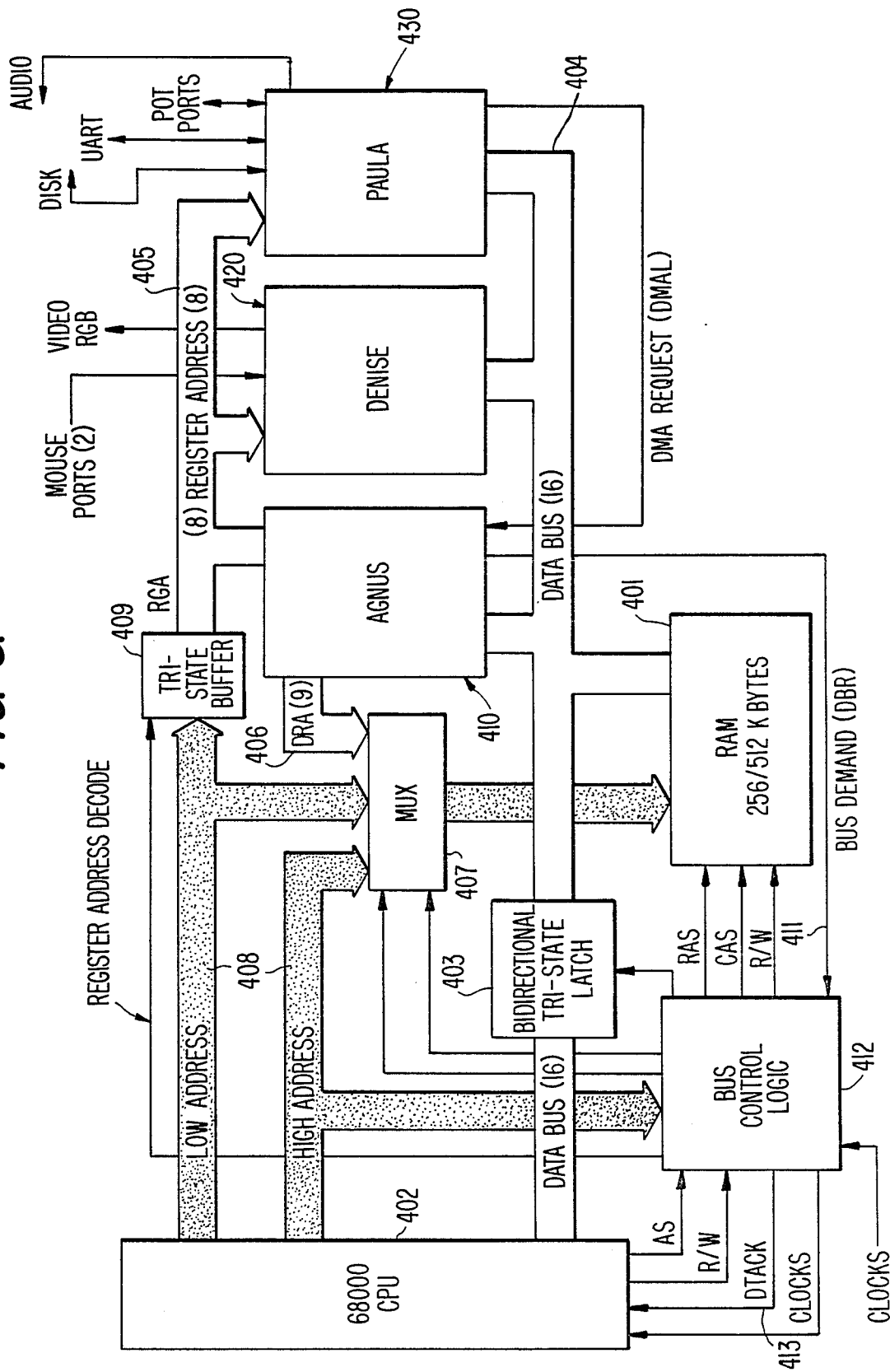
FIG. 8 is a block diagram of the Amiga system.

The Amiga system block diagram in FIG. 8 shows the three custom chips, designated Agnus, Denise, and Paula, and how they are connected to the address and data bus of the Amiga system. The block diagram shows the system data bus connecting the RAM 401 to all three custom chips, and to the 68000 microprocessor 402 through the bidirectional tristate buffer 403. The system data bus 404 is 16 bit and is bidirectional. The register address bus 405, or RGA bus, is bidirectional only with respect to the Agnus chip. The addresses to RAM 401 are input from either the Motorola 68000 processor 402, or from the Agnus chip through the DRA bus 406, with selection of either source under the control of multiplexer 407. The register address bus 405, or RGA bus, is driven when no DMA is occurring by the low address bits on output lines 408 of the 68000 through tristate buffer 409. This allows the microprocessor 402 to read or write the custom chips as if they were random access memory. When a DMA cycle is needed, the Agnus chip 410 informs the microprocessor 402 by asserting the data bus request (DBR) line 411. The bus control logic 412 then outputs signal DTACK on line 413, which suspends operation of the 68000 microprocessor 402, and switches both tristate buffers 403 and 409 so that processor 402 no longer has access to system data bus 404 or RGA bus 405. When in this DMA mode, Agnus chip 410 addresses the RAM 401 with its own RAM address bus, the DRA bus 406, which is selected by the multiplexer 407 for input to RAM 401 under the control of the bus control logic 412, while simultaneously placing a destination address for the data on the register address (RGA) bus 405. The register address on the RGA bus 405 selects one of a plurality of registers on any of the three custom chips, including Agnus chip 410, as the destination of the data from the RAM 401.

Figure 1:
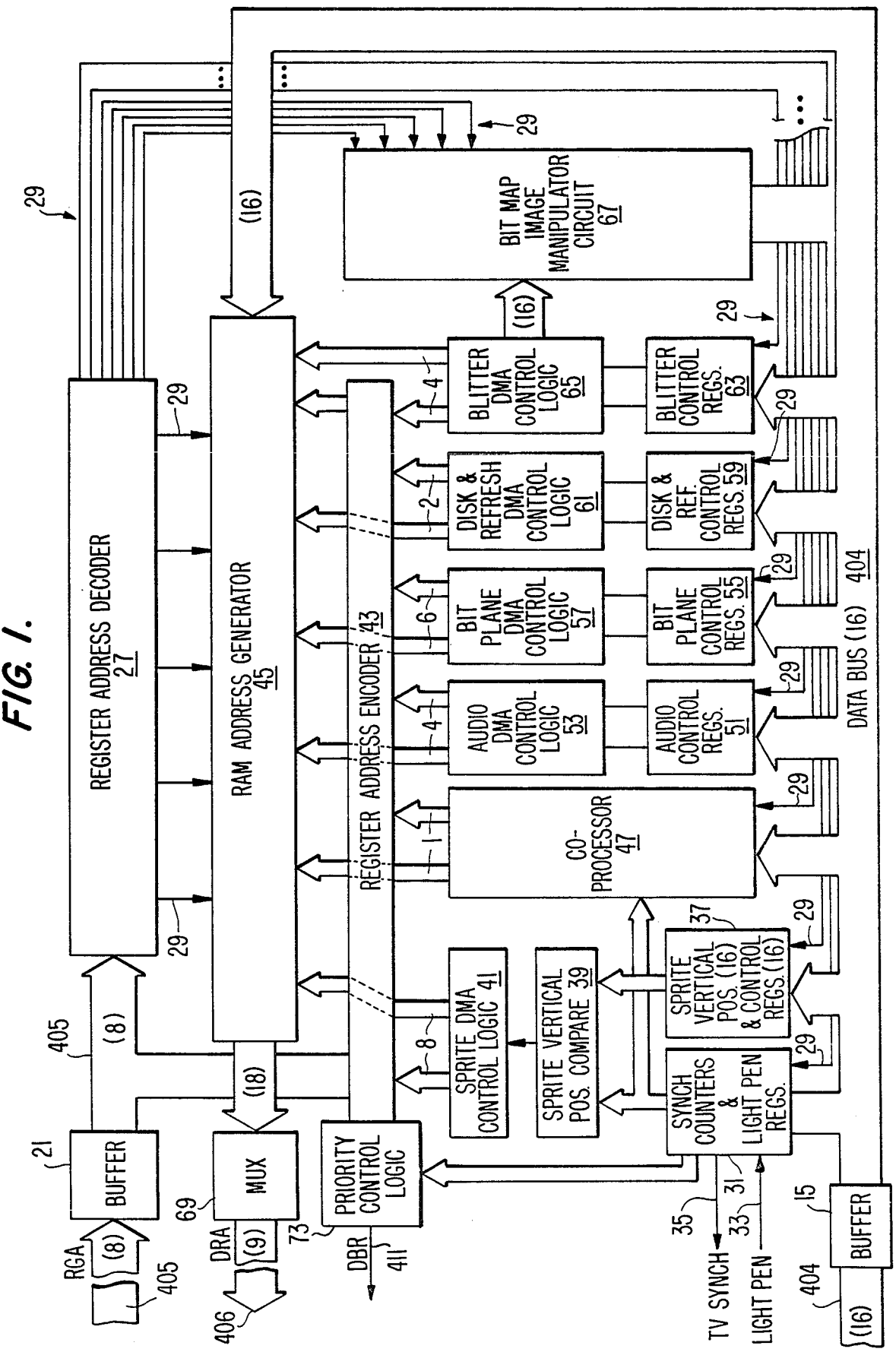
FIG. 1 is a block diagram of the address generator (Agnus) chip.
Figure 9:
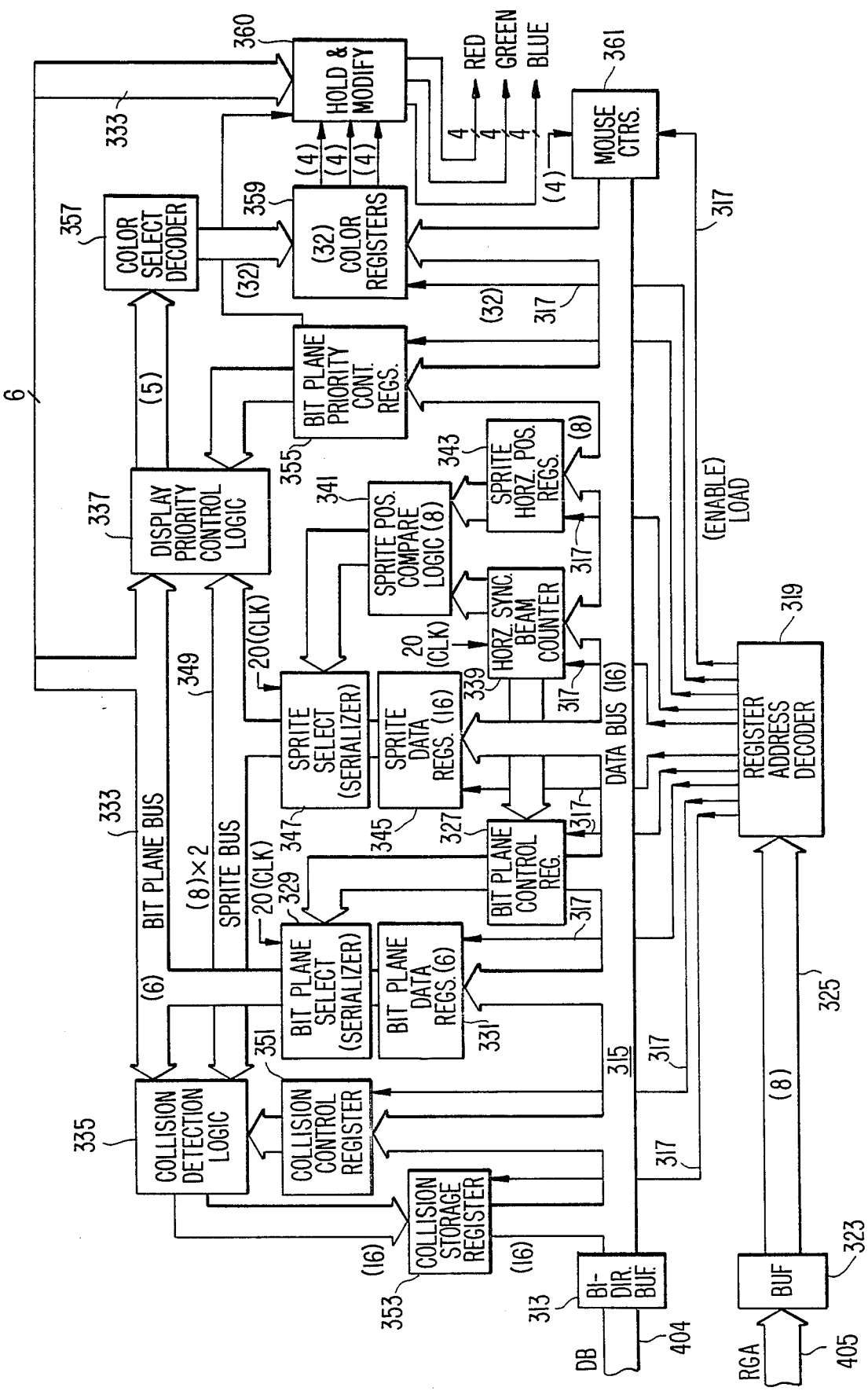
FIG. 9 is a block diagram of the display encoder (Denise) chip.

Operation of the Amiga computer system as a whole with a more detailed description of the interaction between the microprocessor 402 and the custom chips, Agnus chip 410, Denise chip 420, and Paula chip 430, is described in the copending application filed July 19, 1985, entitled "Video Game and Personal Computer", Ser. No. 756,910, which is hereby incorporated by reference. The present application is principally concerned with the hardware and features associated with the Agnus chip 410 and the Denise chip 420. Block diagrams of the Agnus chip and the Denise chip are shown in FIGS. 1 and 9, respectively. A description of the hardware and features associated with the Paula chip 430 is described in the copending application filed July 18, 1986, entitled "Peripheral Control Circuitry for Personal Computer", Ser. No. 886,614. which is hereby incorporated by reference.

The Agnus chip 410 is the address generator chip (FIG. 1). It is 238×281 mils, and contains about 21,000 transistors. Its main function (in chip area) is the RAM address generator 45 and register address encoder 43 that produce all register and RAM addresses during DMA cycles. DMA (direct memory access) is a method for transferring data between memory and one of the custom chips without requiring execution of an "interrupt" routine by the microprocessor 402. The Agnus chip contains all of the DMA channel controllers for the Amiga system. It also contains a hardware bit map image manipulator 67, called the Blitter, and a display synchronized coprocessor 47, referred to as the Copper. The Agnus block diagram shows the DMA control logic and the drivers for the register address bus 405 and RAM address bus 406. The output of each one of the DMA controller circuits is labeled with two numbered arrows. These arrows indicate the number of DMA channels from each of these controllers that are driving the register address encoder 43 and the RAM address generator 45.

The Agnus chip 410 generates two addresses, for the source and destination, for all DMA data transfers involving any of the three chips, including data transfers utilizing registers on the Agnus chip 410 itself. The source of DMA data transfers is almost always the dynamic RAM, which is addressed by the RAM address generator 45. The chip registers are almost always the destination of the DMA data transfers, and are addressed by the register address encoder 43.

The priority control logic 73 outputs a bus demand signal DBR on line 411 to the bus control logic 412 shown on FIG. 8 whenever a DMA operation is needed in order to prevent the 68000 microprocessor 402 from accessing the RAM 401 during a DMA operation. Each of the DMA controllers 41, 47, 53, 57, 61, and 65 sends out a priority request signal and receives a priority enable signal from the priority control logic 73. The actual logic is similar to a daisy chain connecting the DMA controllers and giving different priority to different types of DMA requests. The logic 73 receives the video beam count from video beam counter 117, which is contained within synch counter circuits 31, and which can affect the priority given certain DMA channels. Memory access cycles are allocated among the DMA controllers and the processor 402, as will be described subsequently. Thus, for example, if the video beam count indicates that the beam is scanning the display and is not being blanked, the DMA controller for the bitplane display will be given priority and a bus demand signal will be output by logic 73 whenever the bitplane DMA controller requests access to the data bus 404.

In order to select a register on any of the three custom chips as the destination or source for data to/from the RAM 401 on the data bus 404, the register address encoder 43 places a prewired address on the RGA bus 405 whenever one of the 25 DMA channels on the Amiga computer is activated. All addresses on the register address bus 405 are input to the register address decoder 27 on the Agnus chip 410, which has a plurality of output lines 29 to the Blitter, the Copper, and all the other registers contained on the Agnus chip. If one of the registers on the Agnus chip 410 is being addressed, the decoder 27 places an output on a single one of its output lines 29, which will enable the data bus 404 to be accessed only by the specific register selected by the address on register address bus 405. The register address encoder 43 is driven by the DMA channel controllers and drives the register address bus 405 with a unique code selected by the control logic for each DMA channel. The 8 bits of the RGA bus 405 provide enough address information so that each register on the three chips can have its own unique address, and sometimes separate ones for read/write, without separate chip select lines or register read/write lines. Whenever the Agnus chip 410 is not performing a DMA operation, the encoder 43 will put eight 1's on the RGA bus 405, which signifies the default or "no address" address.

While a destination for data from RAM 401 is placed on the register address bus 405 by the register address encoder 43, the RAM address generator 45 generates an address for accessing a memory word in the RAM 401 and places it on the DRA bus 406. Thus, when a DMA operation occurs, the Agnus chip 410 asserts the data bus demand line 411 and addresses a word in the RAM with RAM address bus 406. The RAM address generator 45 is shown in greater detail in FIG. 4.

Figure 4:
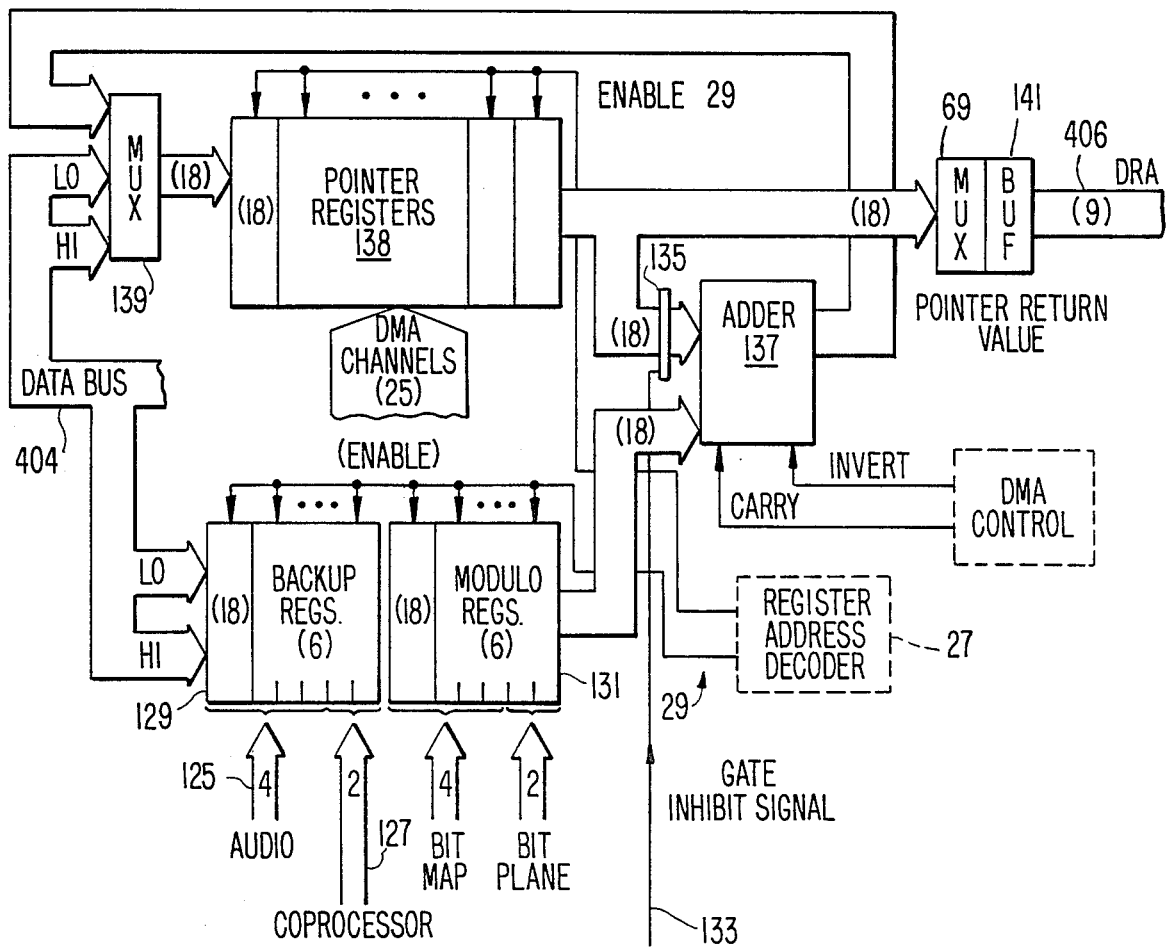
FIG. 4 is a block diagram of the RAM (random access memory) address generator portion of the circuitry.

The Amiga personal computer system provides a total of 25 DMA channels. As shown in FIG. 1, control signals for all 25 DMA channels are input into the RAM address generator 45. The RAM address generator 45 contains a set of 25 pointer registers 138 (FIG. 4). Each of the pointer registers contains an 18-bit address, which points to the location in memory of data to be fetched next for the particular DMA channel. The pointer registers 138 are loaded with data (an address) from data bus 404 by the processor 402 or coprocessor 47 under program control. The DMA channels are associated with the sprite DMA control logic 41 (eight channels), the Copper 47 (one channel), the audio DMA control logic 53 (four channels), the bitplane DMA control logic 57 (six channels), the disk and refresh DMA control logic 61 (2 channels), and the Blitter DMA control logic 67 (four channels). For each of the 25 DMA channels, an 18 bit RAM address pointer is stored in a designated pointer register 138 and is subsequently output on the DRA bus 406 when that channel is active in order to select the memory address of the data in RAM 401 to be accessed by DMA. The DRA address lines from the Agnus chip 410 are already pre-multiplexed within the chip into high and low order bytes by multiplexer 69, so that 9 rather than 18 lines are output from the Agnus chip 410 onto the RAM address bus 406 at one time, thereby saving nine pins for other purposes. The multiplexer 69 in FIGS. 1 and 4 includes an output buffer register 141 that is directly connected to the DRA bus 406.

The RAM address bus 406 is a nine pin bus that carries 18 bits of multiplexed address data to address one of 256K words (512K bytes) stored in the RAM 401. The bus 406 is always driven by chip 410, and will drive the address pins on the RAM 401 when externally selected and demultiplexed. Addresses on the bus are generated one-half memory cycle early in order to be latched into the RAM 401 before data is actually transferred. The least significant nine bits of the RAM address are output on bus 406 during the last half of the preceding memory cycle. The most significant nine bits of the RAM address are output on bus 406 during the first half of the present DMA cycle. During the second half of the present DMA cycle, data contained in the RAM is transferred to the selected register in one of the three custom chips, and simultaneously the least significant nine bits of the RAM address for the next (if required) DMA cycle are placed on the RAM address bus.

If the RAM is the destination during a data transfer, data will be transferred to the RAM from a register during the first half of the present DMA cycle as well, which is called an early read. Although many registers act as sources of data when read by the microprocessor 402, only two chip registers are sources of data for DMA data transfers into RAM 401. These are the Blitter destination register 113 and a disk data read register (not shown). These types of DMA operations use early read cycles because data must be read very early from the chip register in order to have the data available at the RAM 401 before the end of the first half of the DMA cycle. As a result, there is no time for a register address to be placed by the Agnus chip 410 on the register address bus 405. Therefore, the early read addresses put on the RGA bus 405 are only dummy addresses for cycle identification. The chip register data is automatically output by the Agnus chip 410 at the beginning of the present DMA cycle because the chip can determine in advance when either of the these two DMA cycles is about to occur.

The RAM address generator 45 of FIG. 4 is composed of a RAM address bus 406, a group of 25 pointer registers 138, a group of six modulo registers 131, and a group of six backup (or location) registers 129. The 25 DMA channels described above each use an address pointer to address dynamic RAM 401 when access to the data bus is obtained. The registers 138 are 18 bit registers that are loaded with a starting value by the microprocessor 402 or the Copper 47. Each pointer is used as an address on the DRA bus 406 and is typically incremented by one to point to the next address in memory the next time it is utilized. When a DMA channel must be quickly restarted over and over again at the same address, the address pointer is reloaded from a hardware register automatically. This is done using the backup, or location, registers 129. There are six backup registers 129, four for the four audio channels, and two location registers for the two copper indirect jump registers. In the case of audio DMA, the backup value is reloaded into the pointer register whenever the audio waveform being output is finished. In the case of the coprocessor or Copper 47, the backup value is reloaded (strobed) into the pointer register 138 (program counter) whenever the (strobe) address which corresponds to either of the two copper location registers 129 is written.

The bitplane DMA control logic 57 and Blitter 67 are utilized in the display of bit-mapped video images. When the window, i.e., the video image to be displayed on the screen, is a portion of a larger image stored in RAM 401, it is necessary to increase the value of the data address stored in the bitplane pointer registers 138 from an address corresponding to the end of one horizontal line of pixels to the address corresponding to the beginning of the next line of pixels to be scanned for that image. In order to accomplish this, modulo registers 131 are utilized. There are six modulo registers 131, four for the four Blitter channels, and two that are used separately by the three even and three odd bitplane channels. The modulo registers are preloaded with an address jump value that equals the number of words in memory between the last word being displayed on the screen on one horizontal line and the beginning of the first word on the next line. Whenever the end of a video scan line is reached, instead of merely incrementing the address contained in the corresponding pointer registers 138 by one, the address jump value stored in the modulo register 131 is added to the address pointer in order to access the data in RAM 401 corresponding to the beginning of the data to be used in displaying the next video scan line. The six bitplanes have only two modulo registers, so that one register is reserved for even and one for odd numbered bitplanes. Thus, for each of two playfields, a larger image can be stored in memory than is displayed on the screen. Each Blitter channel has its own modulo register. Therefore, each of three "source" images and one "destination" image handled by the Blitter can have images of different sizes stored in memory, although the screen, of course, can only display a window of a single size.

There is an 18 bit adder 137 in the RAM address generator 45 that performs any incrementing and decrementing of the pointers in the pointer registers, and which also adds or subtracts the modulos stored in the modulo registers 131 for the bitplane and Blitter DMA channels when the beam scanning the screen has reached the end of a horizontal scan line (as defined by comparing the video beam count with the value in a data fetch stop register). The adder 137 also can be switched to "add" (substitute) the values in the six backup registers 129 in place of the values in the corresponding pointer registers 138 upon occurence of the audio DMA or Copper DMA events described above. The backup registers 129 and modulo registers 131 have their outputs to the adder 137 under the control of enable lines 29 from the register address decoder 27 of FIGS. 1 and 4, so that only one modulo or backup value is input to adder 137 at a time. As shown in FIG. 4, a gate inhibit signal on line 133, responsive to the Copper 47 and audio DMA controller 53, controls a gate 135. This gate 135 controls the backup reloading operation, during which the gate 135 drives all inputs to adder 137 from the registers 138 to zero, and the adder 137 is operating in the add mode, so that the value in the backup registers 129 is substituted for the previous value in the register 138. An invert instruction and a carry instruction is also provided to the adder 137 from the DMA controllers. Four operations are performed by the adder 137 in response to the two bit input provided by the carry and invert instructions. The invert instruction causes the adder to operate in descending mode, as required, for example, during certain blitter operations involving overlapping memory. Thus, subtract or decrement by one operations are chosen instead of add or increment operations. The carry instruction causes the adder to add or subtract two inputs, instead of merely incrementing/decrementing the pointer, as is required in order to use the modulo and backup values. The adder 137 provides the pointer return value, which is output into multiplexer 139, in order to place the address to be used during the next memory cycle into the pointer register 138. The multiplexer 139 also receives an input from the data bus 404. More than 16 bits are provided from the 16 bit system data bus by repeating several of the bits on the bus as inputs to the multiplexer 139. Either the data on the data bus 404 or the pointer return value from the adder 137 will be selected by multiplexer 139 and be loaded into the particular pointer register 138 selected by the register address decoder 27.

Figure 5:
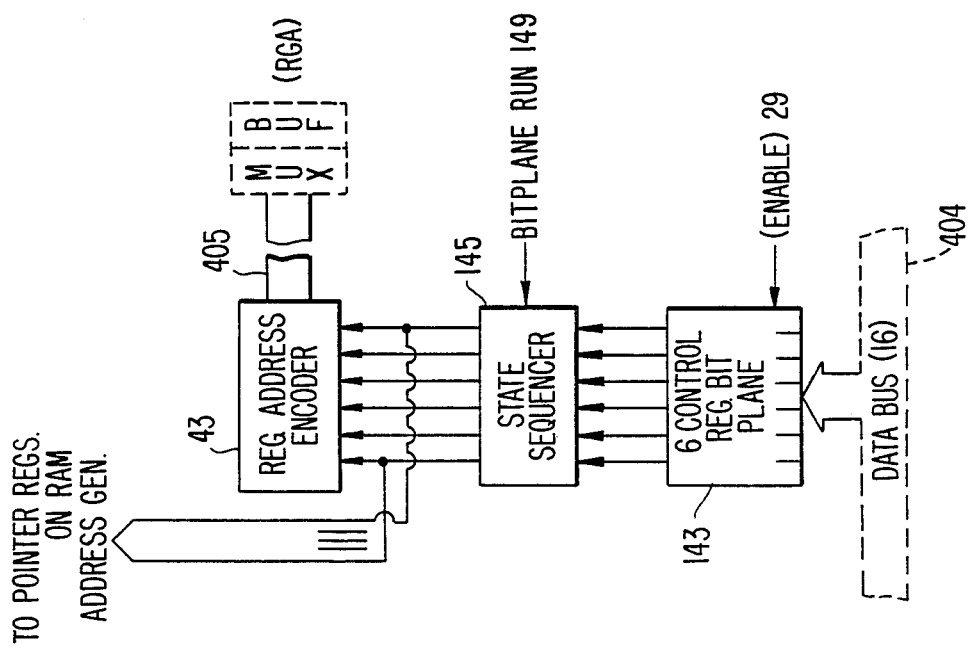
FIG. 5 is a block diagram of the bitplane DMA control logic.

The bitplane control registers 55 and bitplane DMA controller 57 are shown in FIG. 5. There are several bitplane control registers, shown as registers 143, which receive data from the data bus 404. The control registers 143 include bits for enabling each bitplane and are loaded under the control of an enable signal from the register address decoder 27. The outputs from the registers 143 are input in parallel to a state sequencer 145 along with timing inputs and a bitplane run signal. The sequencer 145 pulses one of six output lines for each of the six bitplane DMA channels. Each output line is sent to both the RAM address generator 45 and the register address encoder 43. The outputs to the RAM address generator 45 of FIG. 4 are used to select a particular pointer for output on the RAM address bus 406 in order to access bitplane data stored at that address in RAM. Identical outputs to the register address encoder 43 cause the encoder to select the 8 bit code that must be output on the register address bus 405 in order to select a destination for the bitplane data from memory. The bitplane run signal on line 149 is from bitplane start/stop control logic in the priority control logic 73 and gives priority to the bitplane DMA controller when it requests memory access. The run signal is output only when the video beam count indicates the display is on and must therefore be given priority. This occurs when bitplane start/stop control logic indicates the video beam count is between the limits set in display window start and stop and data fetch start and stop registers included among the bitplane control registers. The circuitry shown in FIG. 5 for generating outputs on lines to the encoder 43 and pointer registers 138 is similar to that used for all the DMA controllers.

Figure 3:
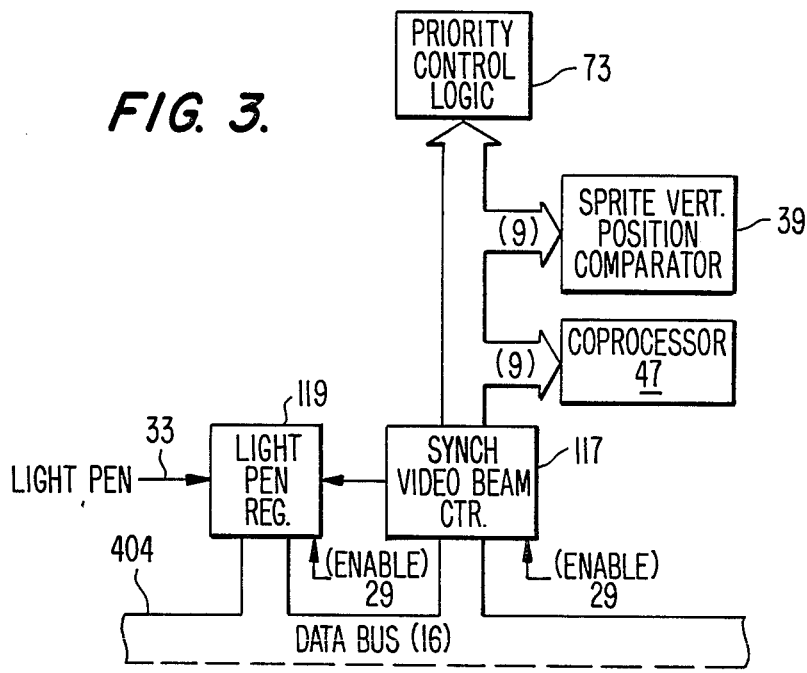
FIG. 3 is a block diagram of the light pen registers and synch counters portion of the circuit.

The synch counters and light pen registers 31 are shown in FIG. 3. The circuitry has access to the data bus 404 when enabled by one of the lines 29 from the register address decoder 27. A light pen input signal 33 is fed into the light pen register circuitry 119, and a television synch signal 35 is output by the synch video beam counter 117 to the display to synchronize its operation with that of the processor. The light pen signal 33 is received from a light pen port connected to the circuit and can cause the beam count when the beam passed the light pen to be loaded onto the data bus 404 under the control of the register address decoder 27. The output of the synch video beam counter 117 is input into the copper 47, the sprite vertical position comparator 39, and into the priority control logic 73. The beam count is important in determining what DMA controllers can demand the next memory cycle, in displaying sprites, and in changing the contents of registers by the Copper 47 during a blanking interval or in the middle of a display.

Figure 6:
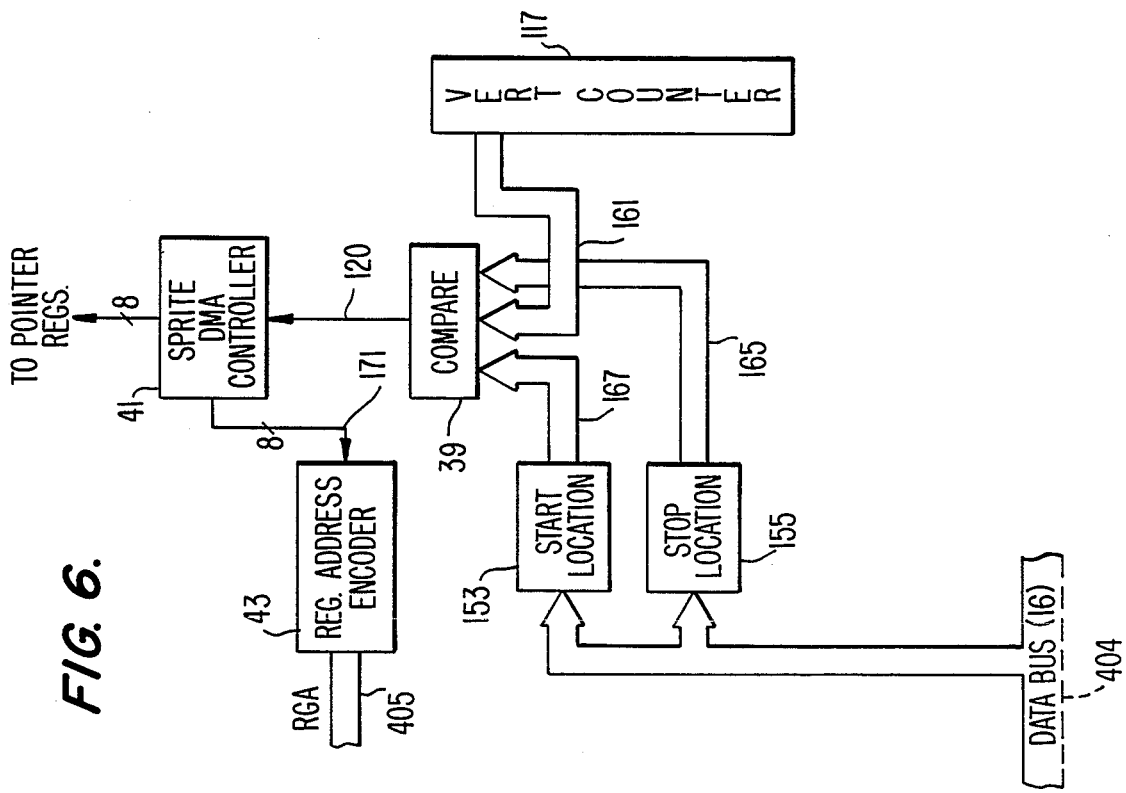
FIG. 6 is a block diagram of the sprite vertical comparator and position registers portion of the circuitry.

The vertical position and comparison logic for the sprites is shown in greater detail in FIG. 6. Vertical start location registers 153 and vertical stop location registers 155 are loaded with data from the data bus 404 for up to eight possible sprites under the control of the register address decoder 27. Each sprite channel sends two output lines 120 to a state sequencer in the sprite DMA controller 41 in order to start and stop display of the sprite. The synch video beam counter 117 outputs the vertical portion of the count to a sprite vertical position comparator 39. The other inputs to comparator 39 are provided by both the vertical start and stop location registers for each sprite. When the vertical count exceeds or equals the value in either of the registers 153 and 155, output is sent on the corresponding line 120 to the sprite DMA controller 41. The sprite DMA controller has a state sequencer that receives the vertical position comparator outputs for each of the eight sprites and, in turn, drives the register address encoder 43 and pointer registers 138 in RAM address generator 45 with output lines for each of the eight sprites.

The Copper 47 is a coprocessor that utilizes one DMA channel to fetch its instructions. The pointer stored in the pointer register 138 corresponding to the Copper 47 is the instruction or program counter, and must be preloaded with the starting address in memory of the program instructions for the Copper. The Copper can control nearly the entire graphics system, freeing the processor 402 to execute program logic. The Copper can also directly affect the contents of most of the registers on the chips. The Copper serves as a powerful tool for directing midscreen modifications in graphics displays and for directing changes in register values that must occur during the vertical blanking period between displays. Among other things, the Copper can control register updates, reposition sprites, change the color palette, update the audio channels, and control the Blitter. The Copper 47 is a coprocessor and has its own instruction set consisting of only three instructions. The Copper can: WAIT for the beam scanning the screen to reach a specific screen position specified as X and Y coordinates; MOVE an immediate data value from RAM into one of the special purpose registers; and SKIP the next instruction if the video beam has already reached a specified screen position. All of these instructions consist of two 16 bit words in sequential memory locations. The Copper fetches both words each time it fetches an instruction. The MOVE and SKIP instructions require two memory cycles and two instruction words, and the WAIT instruction requires three memory cycles. In accordance with the DMA time slot allocation set up for the Amiga system, only the odd memory cycles are requested by the Copper 47, so four memory cycles are required for execution of MOVE and SKIP instructions and six memory cycles are required for the WAIT instruction.

The MOVE instruction transfers data from the RAM 401 to a register destination. The first word in the MOVE instruction contains the address of the destination register, while the second word of the MOVE instruction is irrelevant (it contains the data to be transferred). The WAIT instruction causes the Copper 47 to wait until the beam position count equals or is greater than the coordinates specified in the instruction. While waiting, the Copper is off the system data bus 404 and is not using any memory cycles. The first instruction word contains the vertical and horizontal coordinates of the beam position. The second word contains enable bits that are used to form a mask that indicates which bits of the beam position count to use in making the comparison. The SKIP instruction causes the Copper to skip the next instruction if the video beam position count is equal to or greater than the value given in the instruction.

Figure 7:
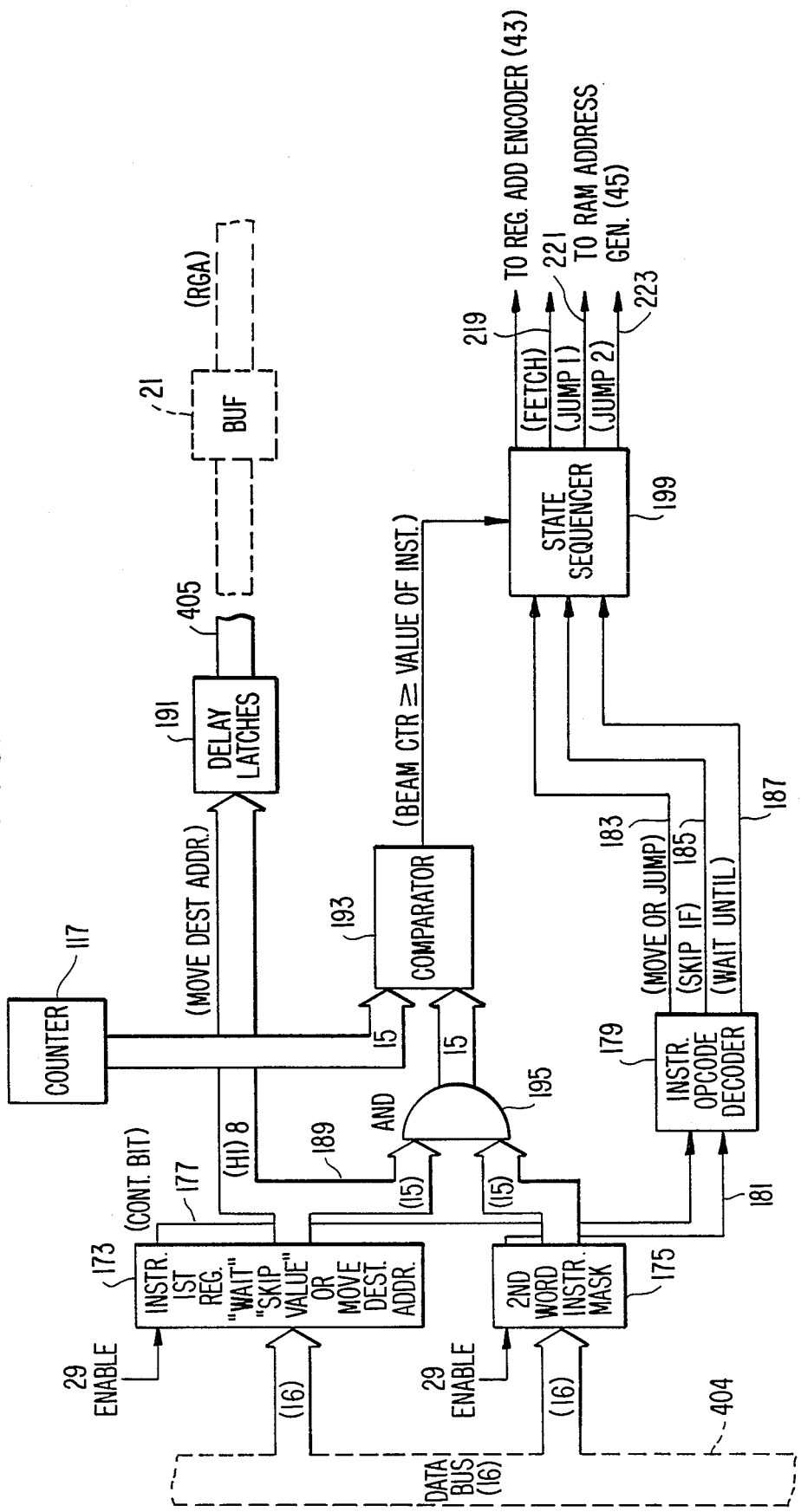
FIG. 7 is a block diagram of the coprocessor (copper)

The Copper 47 is shown in greater detail in FIG. 7. A first instruction register 173 stores the contents of a first instruction word received from the data bus 404, while a second instruction register receives the contents of a second instruction word received from the data bus 404. The loading of data from the bus 404 to registers 173 and 175 is controlled by enable signals sent on lines 29 from the register address decoder 27. The least significant bit in the first instruction word and in the second instruction word are used to determine which of the three possible instructions is to be executed. Thus, single bit control lines 177 and 181 input the least significant bit of the first and second instruction words, respectively, into an instruction operational code decoder 179. The operational code decoder 179 uses the two bits of input to determine the instruction to be executed, and will enable either the MOVE instruction line 183, the SKIP instruction line 185, or the WAIT instruction line 187. These three output lines identifying the requested instruction are input into a state sequencer 199.

The least significant eight bits (not including bit 0) loaded into the first instruction register are output to delay latches 191. If and only if a MOVE instruction is being executed by the Copper 47, these eight bits specify the address of the register that is the destination of the data that is on the data bus during fetch of the second word instruction. If a MOVE instruction is being executed by the Copper, the eight bits from the delay latches 191 will be output at a later time from the register address encoder 43 to the register address bus 405 and the buffer circuitry 21. The placement of the eight bits on the RGA bus 405 enables the particular register being addressed to receive data that is output to the data bus 404 from the RAM 401 address specified in the pointer register 138 corresponding to the copper.

The video beam position counter 117 contained within the synch counter circuitry 31 outputs 15 bits of data to a comparator 193 within the Copper 47. The contents of the video beam position counter 117 indicate the specific position that the electron beam scanning the display has reached on the screen. Bits 1–15 in the first instruction word register during a WAIT or a SKIP instruction specify the horizontal (bits 1–7) and vertical (bits 8–15) beam position, and form one set of inputs to an AND gate 195. The value input from the beam counter is compared within the comparator 193 with a value input from the AND gate 195. The other set of inputs to the AND gate 195 is provided by the least significant bits (not including bit 0) contained in the second instruction word register 175. These bits are enable bits that are used to form a mask, so that the comparator 193 will ignore certain bits in making the comparison during a WAIT or a SKIP instruction. In the comparator 193, the beam position bits specified by the first instruction word that are not masked by the enable bits in the second instruction word are tested against the count of the video beam position counter 117 before any further action is taken. The comparator 193 output is sent to the state sequencer 199.

The state sequencer 199 provides three outputs in response to jump address strobes and to input of the result of the beam count comparison and the inputs identifying the instruction being executed. The fetch output on line 219 is sent to both the register address encoder 43 and the pointer register (program counter) in the RAM address generator 45, so that the Copper 47 can access memory if the priority control logic 73 so allows. Output lines 221 and 223 are sent to the RAM address generator 45 shown in FIG. 4. The gate inhibit signal on line 133 in FIG. 4 results from output lines 21 and 223 being wired-or together, so that either output causes the adder 137 to substitute a value in the backup (location) registers 129 into the program counter 138. The two outputs, Jump 1 and Jump 2, are also sent to two respective location registers 129 containing the address in RAM 401 of the next instruction to be executed by the Copper 47. A first location register 129 and a second location register 129 contain the two indirect jump addresses used by the Copper 47. The Copper 47 fetches its instructions from RAM 401 using its program counter (pointer register 138), incrementing the program counter after each data fetch. When a jump strobe address is written, the address stored in the corresponding location register is loaded into the Copper 47 program counter. This causes the Copper 47 to "jump" to a new location in memory, from which its next program instruction will be fetched. The program instruction fetch then continues sequentially until another jump address strobe from register address decoder 27 occurs. At the start of each vertical blanking interval, the address in first location register 129 is automatically used to start the program counter and the Jump 1 output is activated. Thus, when the end of a vertical blanking interval occurs, the Copper 47 will automatically restart its operations with the instruction in RAM 401 at the address specified in the first location register 129.

The Blitter DMA controller 65 operation is sufficiently described by reference to FIGS. 4 and 5. The Blitter control registers are each enabled by a line 29 from the register address decoder 27 in order to transfer data from the bus 404 into one of the registers 63. The Blitter control registers 63 have outputs sent to a state sequencer, which is similar in structure to the state sequencer 145 described with respect to the bitplane controller 57. The state sequencer outputs, four in all for the four Blitter DMA channels, are input to the register address encoder 43, which provides the priority control logic 73 with a priority request signal in order to generate a data bus demand on line 411 to the bus control logic 412, and which also outputs the code selecting a particular register on the register address bus 405. The four outputs are also sent to the RAM address generator 45, where one of the pointer registers is selected and where additional adder control circuitry exists to generate an invert instruction and a carry instruction as inputs to the adder 137.

The implementation of the audio DMA controller 53 shown on FIG. 1 is very similar to the circuitry shown for FIGS. 4 and 5 for bitplane DMA control. There is a single set of registers 51 for holding left and right audio control information, and these registers have outputs connected to a state sequencer with four outputs similar to the state sequencer 145 shown for the bitplane DMA channels in FIG. 5. Additional outputs are provided, however, to the backup registers by the audio DMA controller rather than to the modulo registers as in the case of the bitplane and Blitter DMA controllers. These outputs, like the Copper 47 jump outputs, are wired-OR together and feed the line 133 providing the gate inhibit signal to gate 135 in order to cause substitution rather than addition by adder 137. In contrast, for the bitplane and Blitter control registers 55 and 63, certain registers (such as the display window start and stop registers or the Blitter size register) are loaded with display position count data in order to enable the sending of outputs to the modulo registers 131 at the proper time.

Figure 2:
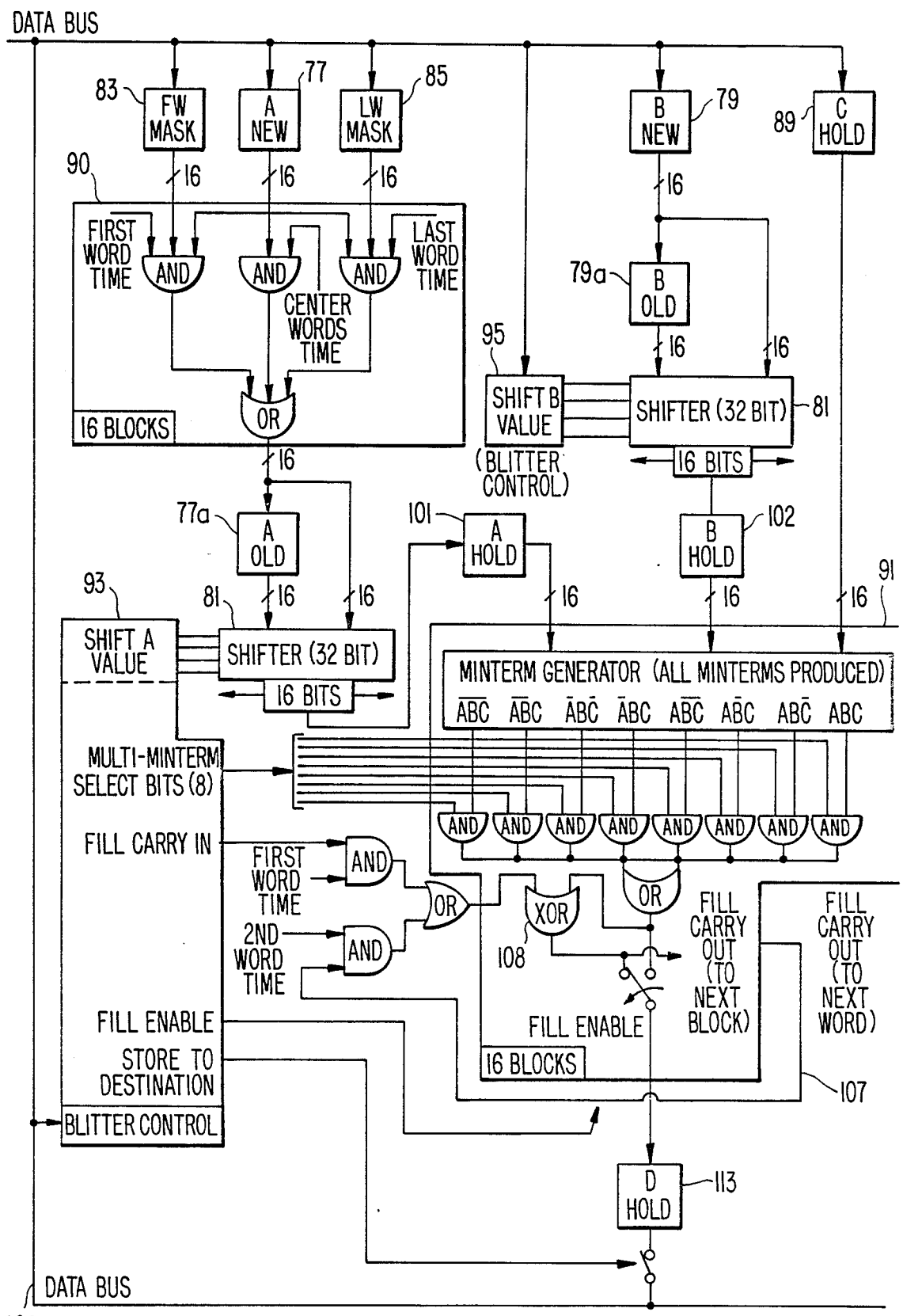
FIG. 2 is an operational block diagram of a bitmap image manipulator (blitter) portion of the circuit.

The hardware for the Blitter 67 is shown in an operational block diagram in FIG. 2. Data on the data bus 404 is input into the A and B source data registers 77 and 79 under the control of the register address decoder 27. The A and B source data registers 77 and 79 each comprise two 16 bit registers, with A and B old source data registers 77a and 79a storing the data word that was previously input to registers 77 and 79. The A and B source data registers each output two 16 bit words into the 16 bit barrel shifter 81. Data on the data bus 404 is also input to first word and second word A mask registers 83 and 85. The output from these mask registers is input for loading into the A source mask logic 90. The A mask logic 90 receives control signals (which also may enable the modulo registers 131) from the Blitter DMA controller 5 of FIG. 1 when the word in register 77 is the first and/or last in the Blitter window for a horizontal line.

Data bus 404 also provides an input into the C source data register 89, which is also loaded under control of the register address decoder 27. The C source data register 89 sends data to a logic unit 91, which is a logic unit that can be controlled to perform any one of 256 possible logic operations on the three inputs it receives from the A, B, and C registers. An A shift count register 93 and a B shift count register 95 among the Blitter control registers 63 are each loaded with four bits of data from the data bus 404. The 4 bit outputs are provided by shift count registers 93 and 95 to the barrel shifter 81. The barrel shifter 81 can perform up to 15 bits of shifting separately for the A and B source data registers 77 and 79, with the shifter containing 32 bits from each source. A 16 bit output from the barrel shifter 81 for each source is provided to the A and B holding registers 101 and 102. The holding registers 101 and 102 have 16 bit outputs. One of the Blitter control register 63 receives a data word from the data bus 404. Eight bits in this Blitter control word contain multi-minterm select bits that are input to the logic unit 91 and select which of the eight available minterms to combine to select one of 256 possible logic operations that can be performed on the A, B, and C source inputs.

The logic unit 91 also includes fill logic circuitry. The fill logic circuitry operates to "fill in" bits between the horizontal outlines of an object that is being displayed on the screen. It generates the data if one of the Blitter control registers 63 has been loaded with bits enabling the fill operation. The fill logic for each bit and each word has a fill carry out signal on line 107 which is input to the logic for the next bit, or for the first bit of the next word if the Blitter operations on the present word are complete. The exclusive OR circuitry 108, once a "1" is found for the first time on a horizontal line, will change all subsequent zeroes on the line to "1"'s, until another "1" is found on the line. The logic unit 91 output is input to a D holding register 113. The output from the D holding register can be sent out on the data bus 404 and stored in the RAM 401.

Data is conveyed with the display encoder (Denise) chip 420 via the data bus 404 (FIG. 9). A bidirectional buffer 313 is connected to the data bus, and a continuation 315 of this data bus continues throughout the circuits on the Denise chip 420. This data bus 315 is 16 bits wide. Various registers receive or send data onto the data bus 315. These registers are controlled by load enable signals 317 from a register address decoder 319, which utilizes destination "instructions" placed into the address decoder 319 via the register address bus 405 and through a buffer circuit 323 connected to a register address bus continuation portion 325, which is 8 bits wide. The register address decoder 319 decodes a destination "instruction" and provides an output on one of the lines 317 to enable a data transfer into or out of a particular destination register.

Among the registers connected to the data bus 315 are bitplane control register 327. These registers 327 send control signals to the bitplane select serializer circuitry 329. Bitplane select serializer 329 acts as a serializer for bitplane data received from the bitplane data registers 331, of which there are six. Each register 331 is connected to send data to the serializer circuitry 329 when selected by the register address decoder 319. The outputs of the bitplane select serializer 329 are six bits corresponding to each of the six bitplanes and constituting the bitplane bus 333. Bitplane bus 333 is connected to output color register selection data to both collision detection logic 335 and display priority control logic 337.

A horizontal synch beam counter 339 exists on the Denise chip, and is synchronized with the beam counter 117 on the Agnus chip 410. The output is connected to the bitplane control registers 327 and to sprite horizontal position comparator logic 341.

Sprite horizontal position registers 343 receive data from the data bus 315. The output from each of eight sprite horizontal position registers 343 is input as a second input to the sprite horizontal position comparator logic 341. This sprite position comparator logic 341 compares an 8-bit word from the horizontal synch beam counter 339 with a word from each of the sprite horizontal position registers 343.

There are two 8-bit sprite data registers 345 receiving data from data bus 315 for each of eight sprites receiving data from data bus 315. These sprite data registers 345 output color register selection data to sprite select serializer circuitry 347, which acts as a serializer and outputs eight pairs of signal lines corresponding to each of eight sprites to form a sprite bus 349. The sprite bus 349 is therefore 16 bits wide. The output from the sprite horizontal position comparator logic 341 is input to the sprite select serializer 347. Sprite bus 349 is connected to output color register selection data to both the collision detection logic 335 and the display priority control logic 337.

A collision control register 351 receives data from data bus 315. The output from the collision control register 351 is input to the collision detection logic 335. A 16-bit output from the collision detection logic 335 is input to a collision storage register 353, which is connected to send the data out on data bus 315.

Bitplane priority and control registers 355 receive data from the data bus 315. The output is connected to the display priority control logic 337. Display priority control logic 337 sends 5-bit color register selection data to a color select decoder 357.

The color select decoder 357 has 32 lines of output which are exclusively selected to enable one of 32 color registers 359, which operate to provide the video to the display using 12-bit codes that control the red, green and blue guns used to generate the image on a display. The 32 color registers 359 are loaded with data from the data bus 315.

The video output is sent to hold and modify logic 360, which also receives inputs from the bitplane bus. The logic 360 is enabled by an output from one of the bitplane control registers 355.

Auxiliary peripheral controllers such as mouse counters 361 can also be connected to data bus 315. Such mouse counters 361 are used with commercial cursor positioning devices. Such mouse counter circuits 361 receive and dump data onto the data bus 315.

Figure 10:
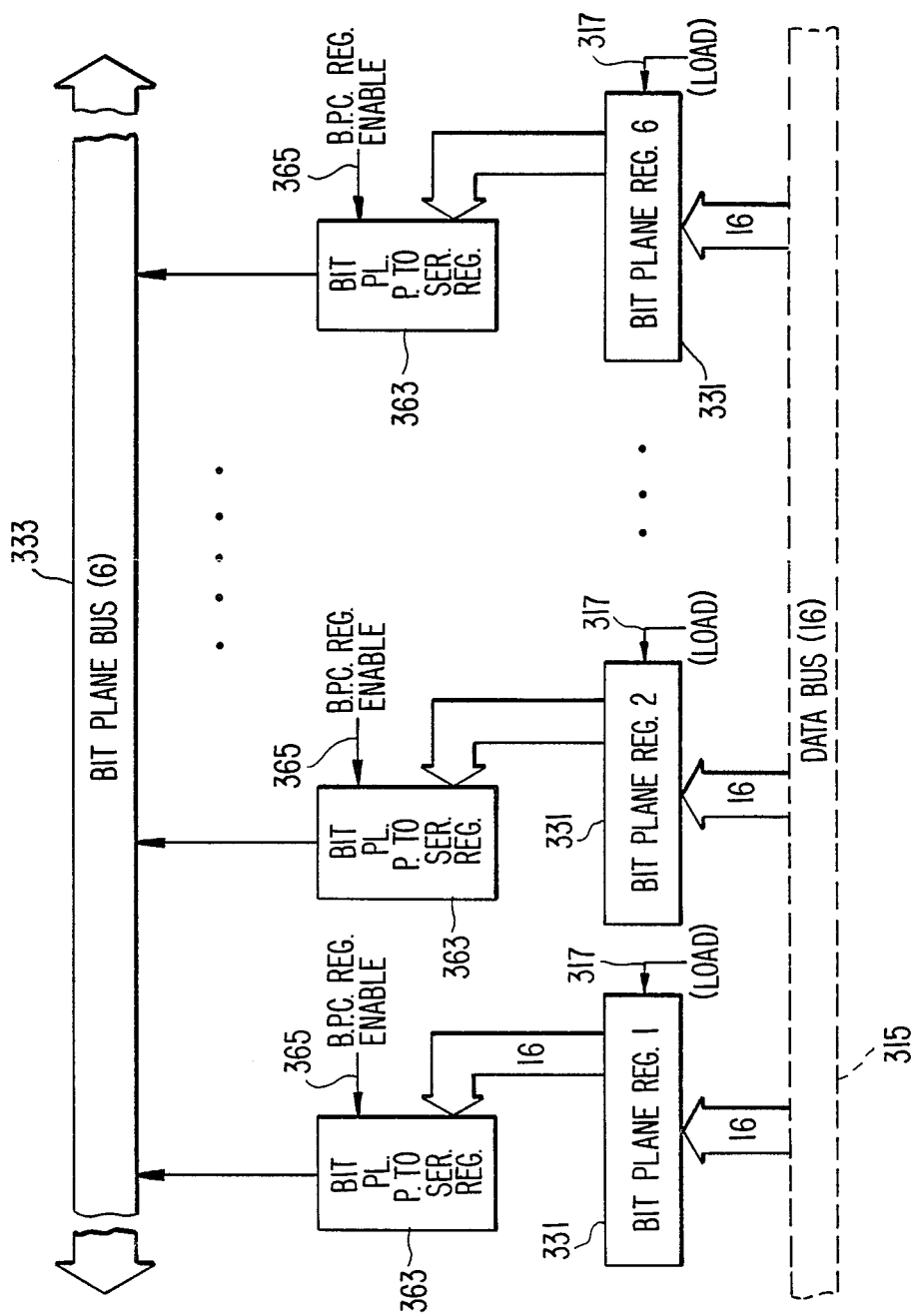
FIG. 10 is a block diagram of the bitplane data registers and serializers.

The bitplane data registers 331, of which there are six, are each 16 bits wide (FIG. 10). Each of the six bitplane data registers 331 passes 16-bit information into a corresponding one of six bitplane parallel-to-serial registers 363 in bitplane serializer 329. The transfer of the data in each bitplane data register 331 to a corresponding parallel-to-serial register 363 occurs after data for all active bitplanes has been transferred to the bitplane data registers 331 under DMA control. Each bitplane parallel-to-serial register 363 passes bitplane information in serial form on a corresponding one of six output lines comprising the bitplane bus 333. This occurs after line 317 to bitplane data register 1 has caused this register to be loaded, triggering the simultaneous dump of data by each of the bitplane registers into the corresponding serializers in response to bitplane control register enable signal on lines 365 from the bitplane control registers 327.

Figure 11:
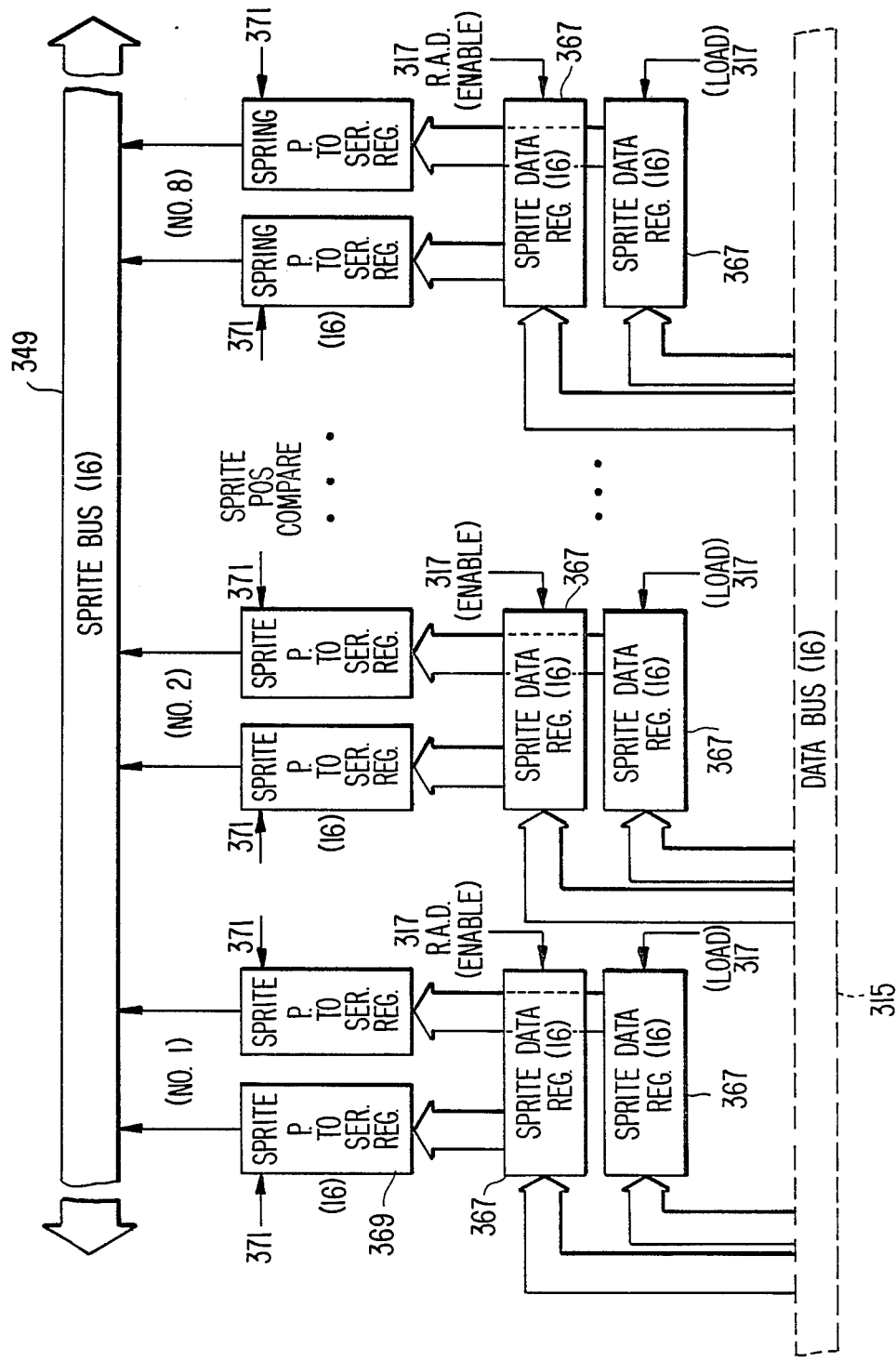
FIG. 11 is a block diagram of the sprite data registers and serializers.

The sprite select serializer portion 147 of the Denise chip, FIG. 11, uses parallel-to-serial conversion and serialization, as does the bitplane select serializer 329 described above. The sprite data registers 345 are comprised of two 16-bit sprite data registers 367 for each of the eight sprites. A total of eight pairs of 16-bit registers 367 receive data from the data bus 315. Each individual sprite data register 367 is connected to a corresponding sprite parallel-to-serial register 369, of which there are also are a total of eight pairs. Each of the 16 sprite parallel-to-serial registers 369 feeds sprite data serially onto a corresponding one of the 16 output lines comprising the sprite bus 333. Output from each pair of registers 369 for each sprite is under the control of signals on 8 pairs of output lines 371 from the sprite horizontal position comparator logic 341 to each of the registers 369.

Figure 12:
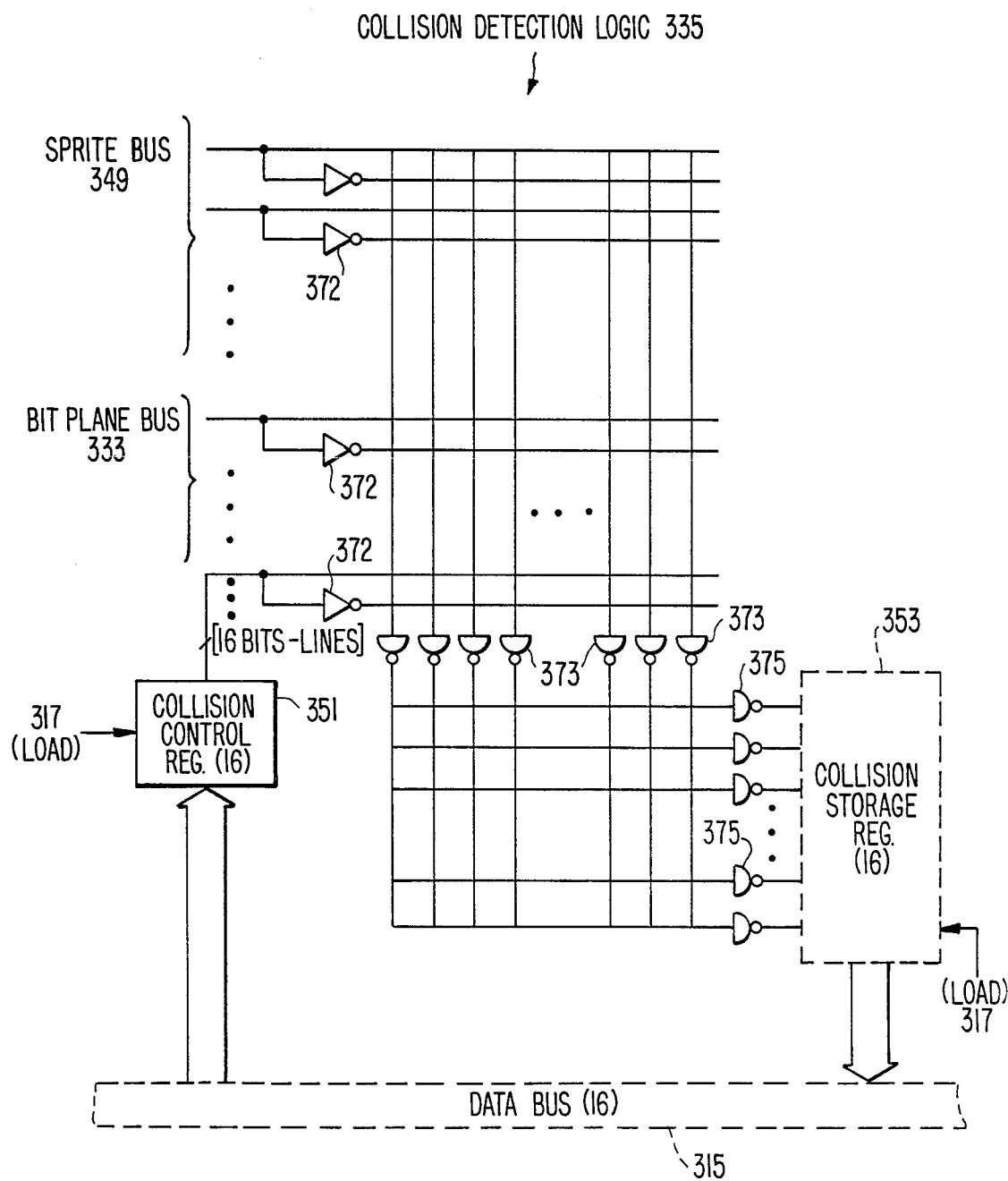
FIG. 12 is a diagram of the collision detection logic.

The collision detection logic 335 is shown in greater detail in FIG. 12. Collisions can be detected when two or more objects, as defined by any non-zero bits used to display any of eight sprites or two playfields, overlap in the same pixel position. A logic array network consisting of two stages of NAND gates 373 and 375 (gates 373 being the first stage and gates 375 being the second stage) forms the collision detection logic. The first stage of NAND gates 373 receive inverted data (using inverters 372) or non-inverted data from each line of the bitplane bus 333 and the sprite bus 349, and from each line output from the collision control register 351. Each of the second stage NAND gates 375 has connected as inputs thereto a selected number of the outputs from the first stage NAND gates 373 for certain sprites or playfields to form a MINTERM. The bits loaded in the collision control register 351 determine whether odd-numbered sprites and specific bitplanes will be utilized by the detection logic 335 in setting the bits in collision storage register 353. Depending on the implementation selected by the bits in control register 351, the polarity of the bits used to detect a collision can also be specified.

The bitplane and display priority portion of the circuit is shown in FIG. 13. The display priority control logic 337 is implemented by a logic array network consisting of two stages of NAND gates 377 and 378. The first stage of NAND gates 377 receives inverted data (through inverters 376) or non-inverted data from each of six lines of the bitplane bus 333 and 16 lines from the sprite bus 349, and also receive inputs from the bitplane priority register 355, to generate an array of MINTERMS. A selected combination of the first stage NAND gate 377 outputs are used to generate the 5 bit output sent to the color select decoder 357. The sprites have fixed priorities with respect to each other, but the priority of the even and odd bitplanes with respect to sprites and each other can be controlled with the bitplane priority register 355.

The color select decoder 357 provides 32 control lines corresponding to the 32 color registers 359 for selecting the three 4-bit color code words for red, green, and blue video color intensity. Each color register is loaded with the bits defining its color from the data bus 315.

THEORY OF OPERATION

There are two basic parts to any display which can be seen on the display screen when using the Amiga personal computer. First, are objects which are easily movable, called sprites. Second, are things which do not move or can only move slowly, called playfields or playfield objects. The playfield is the background against which the sprites and objects may be displayed or with which the sprites and objects can interact. A playfield object is simply a smaller subsection of the playfield, but it is considered by the software in the Amiga system to be an object of some kind. Even though playfield objects are classified as non-moving objects, these objects can appear to move by using a technique called playfield animation. Thus, the Blitter allows playfield objects to be rapidly redrawn on the screen, while saving and restoring the background or playfield onto which they are drawn, to give the illusion of motion.

There are two different operating modes for the playfield display: normal resolution and high resolution. In normal resolution mode, there are 320 picture elements or pixels which form each horizontal line of the screen. This is the resolution generally used for standard home television. High resolution pictures are normally only available on a high resolution monochrome or RGB monitor. In high resolution mode, there are 640 pixels which form each horizontal line of the screen display. There are normally approximately 200 lines per display screen in a vertical direction. In interlace mode, however, there are approximately 400 lines per display screen in the vertical direction. In interlace mode, the video scanning circuitry displays a set of 200 lines during one frame (which occurs 60 times per second), but on the very next display frame, the video scanning circuitry interlaces a different 200 lines on the screen by placing the 200 lines of each frame in between each other. This provides double the vertical resolution. The count from video beam counter 117 includes a long-frame bit used for interlace mode to distinguish the two frames. Bitplane control registers 55 and 327 contain the bits which define both the horizontal bit resolution and the interlace mode for vertical resolution. One bit selects the high resolution mode, and another bit enables the interlace mode.

In the Amiga system, the user can define a color "palette" containing 32 out of a possible 4096 available colors. In normal resolution mode, any one of the 32 colors in the palette can be selected and matched with any one of the pixel elements that make up the overall picture being displayed. A pixel is the smallest picture element in the video display. In high resolution mode, each pixel can be any one of 16 colors contained in the color palette. In the special hold and modify operating mode, up to 3616 colors can be written on the screen at the same time for a standard television, or up to 4096 colors can be drawn on the screen of an RGB monitor.

Each pixel displayed on the screen is represented by one or more bits in the Amiga random access memory 401. Thus, for each individual pixel, there is a corresponding set of bits in the computer memory which determines which of the 32 color registers 359 contains the color information for that pixel. Because the pixels are organized in a two-dimensional (horizontal and vertical) array, the playfield is referred to as a color plane. The corresponding sections in RAM 401 that contain bits that determine the color of each of the playfield pixels are called bitplanes. The value of the color to be used for each pixel is not stored directly as part of the bitplanes in memory, but is rather stored in a color table, previously referred to as the color palette. Thirty-two color registers 359 are contained on the display encoder chip 420, and consist of a set of 12-bit registers, each of which is selectable by one of 32 lines from the color select decoder 357. Thus, any particular pixel on the display can have any one of 32 different colors. The contents of each of the 32 registers are selected by the user. The 12 bits contained in each register allow selection from a total of 4096 possible colors for each color register. The COLOR0 register is always reserved for the background color of the screen. The background color is the color which shows in any area on the display when no other objects are present, since all other objects have a higher priority than the background.

In order to select the color of a particular pixel from a palette of more than two colors, there must be more than a single bit in RAM 401 corresponding to each pixel displayed on the screen so that one of several color registers can be selected. If only one bitplane is used to specify the colors of a playfield, each pixel in that playfield can only have the color specified in color registers COLOR0 and COLOR1. Additional color choices for the pixels become available when several bitplanes are combined in order to specify the color register for each individual pixel. When several bitplanes are combined in order to specify the color of the onscreen pixel elements, the bits from each are combined into a longer binary number which can select additional color registers. Normally, for a single playfield, only five bitplanes can be active in the Amiga system. The combination of five binary bits for each pixel element allows a choice among 32 different color registers 359, each of which specifies a color. Each bitplane forms a separate block of bits stored in RAM 401. However, the display interprets the bitplanes as if they were stacked, so that bits in corresponding positions in different bitplanes are combined by the display hardware to form a binary number which corresponds to a particular color register used to provide the color for that pixel element. A bitplane control register contains three bits which allow the user to designate from 0 to 6 bitplanes for the display.

The bitplane control registers 355 also contain a dual playfield enable bit. In the dual playfield mode of operation, all odd numbered bitplanes are grouped together as playfield 1 and all even numbered bitplanes are grouped together as playfield 2. For example, if six bitplanes are specified and the dual playfield mode is selected, eight different color registers can be designated for any particular pixel by three bits combined for each playfield, and the set of eight color registers is completely separate for each playfield.

A special case exists when the bitplanes contain all zeros for a particular pixel in either playfield 1 or playfield 2. The designation of all zeros for a pixel means that the playfield is in transparent mode. (The COLOR0 register contains the background color.) Wherever the bit combination in either playfield is set for transparent mode the display will show the color of whatever is "behind" (has lower priority than) the particular playfield (e.g., the other playfield, a sprite, or the background color). The user can designate whether certain objects are to be placed in front of or behind each other by controlling the relative visual priority of the playfields and sprites, using the bitplane priority register 355. In dual playfield mode, the two playfields are combined on the screen to form a dual playfield display. If playfield 1 has a higher priority than playfield 2, the color for each pixel element is selected in display priority control logic 337 by utilizing the color registers designated by the odd bitplanes of playfield 1. However, if any pixels on the screen are placed in the transparent mode (all bits are zero) by the odd bitplanes for playfield 1, then the pixels will be colored using the color register designated by the even bitplanes associated with playfield 2. If the bitplanes for both playfields select the COLOR0 register for the same pixel, that pixel element will be colored with the background color contained in the COLOR0 register.

In order to simultaneously display more colors than the 32 possible choices stored in the color registers 359, there is a special hold-and-modify mode. The mode is selected using a bit within the bitplane control registers 355. In this mode, the system interprets the bitplane data in a different manner. As described previously, each color register 359 contains 12 bits that designate a particular color. An RGB color monitor is driven directly by an RGB (red, green, blue) color input signal. An RGB color signal is virtually three monochrome signals, separately driving the red, green, and blue guns of a raster display. When using normal resolution, the 12 bits of the color registers are interpreted such that bits 0 through 3 designate the intensity level for the blue electron gun, bits 4 through 7 correspond to the green electron gun, and bits 8 through 11 correspond to the red electron gun. In hold-and-modify mode, the value in the color output circuitry for the previously displayed pixel is held, and one of the three 4-bit parts of that value is then modified by the data in the first four bitplanes for that pixel. In hold and modify mode, the bit combinations for a pixel element from bitplanes 5 and 6 are used to modify the way in which the bits from bitplanes 1 through 4 are interpreted. The bitplane bus 333 and the 12 video outputs from the color registers 359 are input to the hold and modify circuitry 360, which has 12 video outputs. If the bits in bitplanes 5 and 6 for a pixel are set to zero, the first four bitplanes will be used to choose one of 16 color registers 359. For the three other possible combinations of the two bits from bitplanes 5 and 6, the color of the previous pixel displayed (to the left of the current pixel) will be duplicated, except for a 4-bit modification. The bits contained in bitplanes 5 and 6 determine whether the red, green, or blue portion of the display will be modified. The four bits in bitplanes 1 through 4 will then be used to replace the four (out of 12) bits used in driving either the red, green, or blue gun of the display. Thus, in this mode, two parts (e.g., green and red) of the output from the color registers are held over from the previous pixel, and one part (e.g., blue) is modified by the data contained in the bitplanes.

Each line of pixels that is displayed on a television screen is formed from the overlap of one or more bitplanes containing bits associated with each particular pixel. Each bitplane, in turn, is formed from blocks of 16 bit data words in consecutive locations in random access memory 401. Each line of a bitplane consists of a sequence of data words, with the most significant bit of each data word relating to the leftmost pixel to appear on the display of pixel elements. Each memory word is at a sequentially increasing memory address as one moves from left to right across the display. If the entire bitplane corresponds to pixels that will all be displayed, then the leftmost pixel displayed on any horizontal line corresponds to a bit contained in a memory word at an address one greater than the address of the word containing the bit corresponding to the last pixel on the right of the horizontal line displayed immediately above. Within each data word, each bit represents a single pixel on the screen. The sequence of bits stored in memory defines a two-dimensional plane of bits having one bit for each x and y position defined on the display, referred to as a bitplane. Each bitplane as a whole provides one bit for each possible x-y coordinate on the screen.

In order to display the background color and one or two playfields on the screen, the Amiga system must be given the starting address during the vertical blanking time for the data block for each of the bitplanes to be used. The start of the bitplane data is specified using pointers contained in the pointer registers 138 of FIG. 4, with one register existing for each of the six possible bitplanes. The bitplane pointers are address pointers which point to the starting address within RAM 401 at which the data for a specific bitplane actually starts. The pointers in the registers 138 are 19 bits wide and are dynamic. Once the fetch of bitplane data begins during DMA cycles, the pointers in registers 138 are continuously incremented using adder 137 to point to the address of the next word in RAM 401 to be fetched. The address of the data being accessed is then placed on the DRA bus 406 by the RAM address generator 45 of the Agnus chip 410. When the electron beam for the television screen reaches the last pixel to be displayed on a horizontal line (as determined by the beam count), it will have fetched the last data word for that line. Each pointer for each of the bitplanes is then adjusted by the modulo amount contained in the modulo registers 131, which is added to the pointer value stored in registers 138 using the adder 137. The addition of the modulo amount ensures that the next data word fetched will be the word in memory corresponding to the leftmost pixel to be displayed on the next line of the screen. Separate modulo amounts can be used for the even and odd bitplanes and stored in two modulo registers 131.

As described previously, there are 320 pixels in each horizontal line in normal resolution mode. Each data word consists of 16 bits, so that 20 data words containing 320 bits are sufficient for each bitplane to contain all the data corresponding to one horizontal line of pixels being displayed. If the size of the bitplane is exactly the same as the size of the display window, then zero is loaded into the modulo register 131. In this case, the number of bits stored in RAM 401 is exactly the same as the number of pixels which will appear on the screen. As each data word for the bitplane is fetched as the electron beam travels horizontally along the screen, the pointer for that bitplane is incremented by one by adder 137. Thus, after each horizontal line is scanned by the beam, the value (in words) stored in the pointer register 138 when the data fetch for the next line is begun will exceed the pointer value when the previous line was begun by 20. However, if, for example, the bitplane has exactly twice the number of bits per horizontal line as the number of pixels to be displayed, a modulo of 20 words must be used to assure that the data used to generate the colors for the next line of pixels are the bits relating to the next horizontal line. After displaying the last pixel on a horizontal line, the pointer corresponding to that bitplane in one of the six bitplane pointer registers 138 contains a value corresponding to the starting memory address for that line plus 20. A modulo of 20 words must be added to this pointer using modulo register 131 and adder 137, so that when the data fetch for the next horizontal line begins, the next 20 words in memory (corresponding to the part of the playfield picture that is to the right or left of what can be displayed on the 320 available pixels at that particular instant) will be skipped. In this manner, the address of the data not used in the current display is not placed by the generator 45 on the RAM address bus 406. When the high resolution mode is being used to display the playfields, 40 words of data must be fetched for each line instead of 20, and the modulo is 40 when the bitplane is double the window size.

The system can be directed to display another portion (e.g., the right half) of the picture defined by a bitplane that is larger than (e.g., twice) the size of the allowable display window. In such a case, a different pointer value is loaded into the pointer register 138 for that bitplane when the first bit is fetched for display of the upper left pixel on the screen (during vertical blanking). To display only the right half of a picture defined by bitplanes with 640-bit wide horizontal lines, the value of the pointer must be 20 words (320 bits) higher than the starting address when only the left half of the picture is displayed. In this case, the modulo would remain at 20 to prevent the addressing of data related to the left half of the picture after each line is scanned.

The modulo stored in the bitplane modulo registers 131 is also used in producing an interlaced picture. A frame bit generated by the video beam counter 117 can be loaded into a control register and read during the vertical blanking routines of the operating system. Depending on the state of this bit, the system will produce either an odd frame or an even frame. Based on the value of this bit, for odd frames the vertical blanking routines will load the bitplane pointer register 138 with an address corresponding to line one, whereas for even frames an address corresponding to data related to line two is loaded. The copper 47 skip instruction can be utilized to achieve this. The display of alternate lines of a complete picture contained in memory during alternate frames of the display requires setting the modulo number in registers 131 equal to the total number of words in memory relating to a single horizontal line plus the normal value associated with the modulo (the number of words by which the data in memory defining a particular horizontal line exceeds the number of pixels that are displayed on the screen at any one time.) If the "picture" stored in memory is defined as 400 lines long, the 200 odd numbered lines are shown during one frame, and the other 200 even numbered lines are shown during the next frame to form the complete picture. The scanning circuitry vertically offsets the start of every other field by half a scan line in interlaced mode. For odd frames, the pointer loaded in the pointer register 138 for a bitplane during the vertical blanking interval is set at some starting memory address. Then, for even frames, the value of the pointer loaded in the pointer register 138 at the beginning of the scan of an even frame corresponds to the original starting memory address plus the total number of words in memory containing bits relating to a single horizontal line.

To create a playfield that is the same size as the television screen, a width of either 320 pixels or 640 pixels (high resolution) is chosen. The height can be either 200 lines or 400 lines (interlaced mode). The actual size of the on screen display, however, can be further adjusted by defining a window size. Nothing will be displayed outside of the defined display window, including playfields and sprites. The display window size is defined by specifying the horizontal and vertical positions at which the display window starts and stops. The resolution of vertical start and stop is one scan line; the resolution of horizontal start and stop is one low resolution mode pixel. The display window start register controls the display window starting position. Both the horizontal and vertical components of the display window starting positions are loaded into this register, which is located among the bitplane control registers 55 on the Agnus chip 410, by either the processor 402 or the Copper 47. Similarly, a display window stop register exists on the Agnus chip 410 and is loaded with the horizontal and vertical components of the display window stopping position. The stopping position, like the starting position, is interpreted in low resolution non-interlaced mode, even if the high resolution or interlaced modes are selected.

After the size and position of the display window is defined using the display window start and stop registers, the onscreen location for the data fetched from memory must be identified. This is done by loading the horizontal positions where each line starts and stops to a data fetch start register and a data fetch stop register located among the bitplane control registers 55. Unlike the display window registers, which have a one pixel resolution (low resolution mode), the data fetch registers have a 4 pixel resolution because only five bits are used in either register to specify the beginning and ending position for the data fetch. The hardware requires some time after the first data fetch before it can actually display the data. As a result, there is a difference between the value of window start and data fetch start, and the registers control the horizontal timing of the bitplane DMA data fetch. In low resolution mode, the difference is 8.5 clock cycles; the difference is 4.5 clock cycles in high resolution mode. As described previously, the bitplane address pointers stored in pointer registers 138 are used to fetch the data to the screen. Once the data fetch begins, the pointers are continuously incremented to point to the next word. The data fetch stop register defines when the end of a horizontal line is reached, at which point the bitplane run signal is off and the modulo contained in the modulo register 131 for that bitplane is added to the pointer for that bitplane. Thus, the pointer is adjusted to contain the address of the first word of data to be fetched for the next horizontal line. There are two modulo registers, the bitplane1 modulo register for the odd numbered bitplanes (or for playfield 1 when operating in the dual playfield mode) and bitplane2 modulo register for the even numbered bitplanes (or for playfield 2 when operating in the dual playfield mode).

To start the display of the playfields, the pointers for the bitplanes must be set and the bitplane DMA is turned on. The bitplane DMA is turned on by setting a bit in a DMA control register. Each time the playfield is redisplayed after the vertical blanking interval, the bitplane pointers must be reset. Resetting is necessary because the values in the pointer registers have been incremented to point to each successive word in memory for each set of bitplanes and must now be repointed to the first word for the next display. Program instructions for the Copper 47 are used to perform this operation as part of a vertical blanking task.

One of the features of the Copper 47 is its ability to wait for a specific video beam position, then move data into a system register. During the wait period, the Copper 47 examines the contents of the video beam position counter 117 directly. Thus, while the Copper 47 is waiting for the beam to reach a specific position, it does not use the data bus 404 at all. Therefore, the data bus 404 is freed for use by other DMA channels or by the microprocessor 402. When the wait condition has been satisfied, the Copper 47 steals memory cycles from either the Blitter 67 or the processor 402 to move the specified data into the selected special purpose registers. The copper 47 is a two cycle processor that requests the bus only during odd numbered memory cycles. This prevents collision with audio, disk, refresh, sprites, and most low resolution display DMA access, all of which use only the even numbered memory cycles. The Copper 47 therefore needs priority over only the processor 402 and the Blitter 67.

The Copper 47 instruction list is sufficient to accomplish all the register resetting done during the vertical blanking interval and the register modifications necessary for making midscreen alterations. For example, the pointers for the odd and even bitplanes used in playfield displays an the sprite pointers must be rewritten during the vertical blanking interval so that the data relating to the top left of the screen will be retrieved when the display starts again. This can be done with a copper instruction list that does the following: (1) wait until the video beam reaches the first line of the display; (2) MOVE starting address in RAM 401 for odd bitplane data to the first bitplane pointer register; (3) MOVE starting address for even bitplane data to second bitplane pointer register; (4) MOVE data to first sprite pointer register; etc. As another example, the color registers can be reloaded with bits specifying the display of different colors in the middle of the display of a screen. Thus, the program instruction list for the Copper 47 would wait for the first line of the display, then move a series of 12 bit codes into several of the color registers, wait for a subsequent line of the display (such as the first line corresponding to a reuse of a particular sprite processor), and then move 12 bits of data specifying a new set of colors into some of the color registers previously loaded during the first line of display.

The Copper 47 fetches its instructions by using its program counter and increments the program counter after each fetch. The Copper 47, however, has two jump strobe addresses, jump 1 and jump 2. When an attempt is made to write to either the jump 1 or jump 2 strobe addresses, the program counter of the Copper 47 is loaded with a new address. The Copper 47 has a first and a second location register 129, which contain RAM addresses. Whenever a jump strobe address is written, the address contained in the corresponding location register is loaded into the copper program counter (pointer register) using adder 137 and the gate inhibit signal. This causes the Copper to jump to the address specified in either the first or second location register 129, and to execute the instruction contained at that RAM address. The instruction fetch then continues sequentially until the Copper 47 is interrupted by another jump address strobe. At the start of each vertical blanking interval, no matter what the Copper is doing, the Copper is automatically forced to restart its operations at the address contained in the first location register. The Copper can also write to its own location registers and then to its strobe addresses to perform programmed jumps. Thus, the Copper can move a new address into the second location register. Then, a subsequent move instruction executed by the Copper that addresses the jump 2 address causes the new address in the second location register to be strobed into the copper's program counter. At power on or reset time, the first and second location registers of the copper must be initialized and the jump strobe address must be written to so that a known start address and known state is ensured before the copper DMA is first turned on. Then, if the contents of the first location register are not changed, the copper will restart at the same location every time vertical blanking occurs for each subsequent video screen. One bit in a DMA control register is set in order to enable coprocessor DMA operations.

In order to obtain a background display that moves, a playfield larger than the display window is stored in memory and scrolled. When using dual playfields, each playfield can be scrolled separately. In horizontal scrolling, one additional word of data must be fetched for the display of each horizontal line, and the display of this data must be delayed. In vertical scrolling, the starting address loaded into the bitplane pointers is increased or decreased by an integral multiple of the amount of words taken up by a horizontal line in memory. This causes a lower or higher part of the picture to be displayed after each vertical blanking interval. To accomplish vertical scrolling, during each vertical blanking interval, the Copper must increase or decrease the value of the pointer stored in the bitplane pointer register 138 by an amount large enough to ensure that the display begins at least one horizontal line later or earlier each time. For either type of scrolling, the Copper 47 can be used during the vertical blanking interval to reset pointers and data fetch registers. For a low resolution display in which only 20 words of data is used for each horizontal line, the starting address loaded into the pointer register 138 by the Copper 47 would be changed by a multiple of 20 words during each vertical blanking interval.

The playfields can be scrolled horizontally from left to right or vice versa on the screen. Horizontal scrolling is controlled by specifying the amount of delay prior to display of the pixels. The delay occurs when an extra word of data for a horizontal line is fetched but is not immediately displayed. The additional data word is located to the left of the left edge of the display window and is retrieved before normal data fetch begins. As the beam scans to the right, however, the bits in this additional data word are used to define the color of the pixels appearing on screen at the left hand side of the window, and data formerly used to color pixels appearing on the right hand side of the screen no longer appears during the display. For each pixel of delay specified, the onscreen data shifts one pixel to the right after each vertical blanking interval. The greater the delay utilized, the greater the speed of scrolling of the display. Up to 15 pixels of delay can be specified by loading a bitplane control register 327 with four bits of data specifying the delay for playfield 1 and four bits of data specifying the delay for playfield 2. Thus, in horizontal scrolling, the data fetch start register must be loaded with a beginning position for the data fetch that is 16 pixels (one extra word) before the unscrolled beginning position for data fetch, the modulo for the playfield must be increased by one word, and the number of bits of delay must be loaded into a bitplane control register 327.

The term Blitter stands for block image transferer. The primary purpose of the Blitter 67 is to copy (transfer) data in large blocks from one memory location to another, with or without further processing. The operations it performs after its registers are set up are considerably faster than those performed by the microprocessor 402. The Blitter 67 is very efficient at copying blocks of data because it needs to be told only the starting address in RAM 401, the destination address in RAM 401, and the size of the block. It will then automatically move the data block, one word at a time, whenever the data bus 404 is available. The Blitter will signal the processor 402 with a flag and an interrupt when the transfer has been completed.

The Blitter performs its various data fetch, modify, and store operations through DMA sequences, and it shares memory access with the other devices in the Amiga system. Disk DMA, audio DMA, bitplane DMA, and sprite DMA all have the highest priority level. Each of these four devices is allocated a group of time slots during each horizontal scan of the video beam. If a device does not request one of its allocated time slots, the slot is open for other uses. First priority is given to these devices because missed DMA cycles can cause lost data, noise in the sound output, or interruptions in the display on the screen. The Copper 47 has the next priority because it must perform its operations at the same time during each display frame to remain synchronized with the video beam sweeping the screen. The lowest priorities are assigned to the Blitter 67 and the microprocessor 402, in that order. The Blitter 67 is given the higher priority because it performs data copying, modifying, and line drawing operations much faster than the microprocessor 402. During scan of a horizontal line, there are typically 227.5 memory access cycles, each of which is approximately 280 nanoseconds in duration. Of this time, 226 cycles are available to be allocated to the various devices needing memory access. The memory cycles are allocated as follows: four cycles for memory refresh (assigned only to odd numbered cycles); three cycles for disk DMA (assigned only to odd numbered cycles); four cycles for audio DMA (assigned only to odd numbered cycles, one word per channel); 16 cycles for sprite DMA (assigned only to odd numbered cycles, two words per channel); and 80 cycles for bitplane DMA (can be assigned only to odd numbered cycles if display is low resolution and contains four or fewer bitplanes). The microprocessor 402 uses only the even numbered memory access cycles. Normally, during a complete processor instruction time, the processor 402 spends about half of the time doing internal operations and the other half accessing memory. Therefore, by allocating every other memory cycle to the 68000 processor, the processor 402 can run at full speed because it appears to the processor that it has memory access all of the time. Thus, the 68000 runs at full speed most of the time if there is no Blitter DMA interference. If cycles are missed by the 68000, it waits until its next available memory cycle before continuing. However, if there are more than four bitplanes being displayed, or a high resolution display is used, bitplane DMA will begin to steal cycles from the 68000 during the display. If, for example, four high resolution bitplanes are specified, bitplane DMA needs all of the available memory time slots during the display time (bitplane run signal is on) in order to fetch the 40 data words needed for each line for each of the four bitplanes. This effectively locks out the processor 42 as well as the Blitter 67 and Copper 47 from any memory access during the display. During the display time for a four bitplane low resolution display, 80 odd numbered time slots are reserved for the bitplane DMA and the 80 even numbered time slots are all available for the processor 402. For a display of a six bitplane low resolution display, bitplane DMA steals half of the 80 even numbered slots during the display because 120 time slots are needed to fetch 20 data words for six bitplanes. No memory time slots are available during display of a four bitplane high resolution display because all 160 time slots are needed to fetch the 40 data words for each of the four bitplanes.

The Blitter 67 normally has a higher priority than the processor 402 for DMA cycles. If given the chance, the Blitter would steal every available memory cycle, blocking the processor 402 from bus access. By setting a bit in a DMA control register, the Blitter will be given priority over the processor 402 for every available memory cycle. However, if the bit is not set, the Blitter 67 will be forced to release the data bus 404 to the processor 402 for one cycle if the processor 402 is unsatisfied for three consecutive memory cycles.

The Blitter uses up to four DMA channels. Three DMA channels are dedicated to retrieving data from RAM 401 to the Blitter 67, and are designated as source A, source B, and source C. The one destination DMA channel is designated as destination D. A Blitter control register 63 is loaded with data from data bus 404 to indicate which of the four DMA channels are to be used, with four bits needed in all to independently enable each of the four channels. Each of the Blitter source and destination channels has its own memory pointer register 138 and its own modulo register 131. This allows the Blitter to move data to and from identical rectangular windows within larger playfield images that can be of different sizes for each of the sources and for the destination block in memory. The pointer registers 138 for the Blitter channels are used to point to the address in RAM 401 where the next word of source or destination data is located. Similar to the bitplane operations described previously, the Blitter 67 uses modulos to allow manipulation of smaller windows within larger images stored in memory. When the modulo amount stored in the corresponding modulo register 131 is added to the value in the appropriate pointer register 138, the address pointer will identify the start of the next horizontal line after the last word in the window on the previous line has been processed. When operating on data words contained on the same horizontal line of a window of selected size, the address contained in the pointer register 138 will be incremented by one word each time. It is possible to specify blocks of data for the sources and destination that overlap. In such a case, it is possible that the Blitter will write to a particular memory address within the destination block before the data at that same address was read by the Blitter as the source. To prevent such data destruction, it is possible to either increment or decrement the pointer values as the data is being processed using an invert instruction signal. For example, the value in the pointer registers should be decremented and the Blitter should operate in descending mode if there is an overlap between the source and destination blocks of data and it is desired to move data toward a higher address in RAM 401. The descending or ascending mode of operation is selected by loading a bit contained within the Blitter control registers 63.

A Blitter size register included among control registers 63 is loaded with the width and height of the window being operated on by the Blitter. Ten bits in this register define the height of the Blitter operation, up to a maximum of 1024 lines. Six bits in this register define the width of the Blitter operation, up to a maximum of 64 words or 1024 pixels. Loading data into the Blitter size register starts operation of the Blitter, and is done last after all pointers and control registers have been initialized.

Instead of simply retrieving data from a single source, the Blitter can retrieve data from up to three sources as it generates a result for a possible destination area. These sources are usually one bitplane from each of three separate graphic images. The Blitter logic operation is defined by describing what occurs for all of the possible combinations of one bit from each of the three sources. The eight possible data combinations of three bits are referred to as MINTERMS. For each of the eight input possibilities, the value of the bit output to the corresponding destination in RAM 401 must be specified. One of the Blitter control registers 63 is loaded with eight bits used as logic function MINTERM select lines. The setting of these eight bits specifies one of 256 possible logic operations to be performed on the data from three sources during the Blitter operation.

The Blitter 67 is extremely efficient in performing bitplane animation because it can logically combine data bits from separate image sources during a data move. For example, it may be desired to move a predrawn image of a car in front of a predrawn image of a building. To animate (move) the car, the first step is to save a window containing the background image where the car will be placed. Data containing the complete outline (mask) of the car is created somewhere in memory and can be designated as source A, the data containing one of the bitplanes defining the color for the car object itself can be designated as source B, and the data containing the background (or building) can be referred to as source C. Next, a temporary location T in RAM 401 is designated the destination for the background of source C where the car is going to be placed. The AC logic operation is selected, which will save the background by copying it to a new destination at all points where the outline mask of the car (A) and the background (C) exist at the same location. The next step is to copy the car in its first location. The destination selected this time is the same as the block of data containing the background (C). The AB+$\overline{A}$C operation is used to indicate that the window will now contain the car data (B) wherever the car outline mask (A) exists, but will keep the previous background data (C) wherever the car outline mask does not exist ($\overline{A}$). If the car was already present somewhere on the display, the old background image which the car covered prior to moving must be restored at the location from which the car was moved before copying the background that will be covered next. The background (C) is the destination and the operation AT is used, where the source T is the temporary destination at which the background where the car was previously placed was stored using the AC operation. This AT logic operation replaces the background (C) with the saved background at all places where the car outline mask (A) existed. If the data and the mask is shifted to a new location and the logic operations above are repeated continuously by the Blitter, the car will appear to move across the background. The logic operation in which the new image is created using the logic operation AB+$\overline{A}$C is referred to as the "cookie cut" operation.

In the example just described, the car image (B) and the car outline mask (A) must be shifted to a new position each time before the background is saved ($\overline{A}$C) and the car is placed (AB+$\overline{A}$C). The movement of an image (B) across a background (C) can cause the edge of the image to land on any bit position within a 16 bit word. This creates a need for a high speed shift capability within the Blitter 67. Accordingly, the Blitter contains a barrel shifter 81 that is used with both the A and B data source registers 77 and 79. The shifter 81 can shift sources A and B from zero to 15 bits. It is a true barrel shifter in that bigger shifts do not take more time than smaller shifts, as they would if performed by the microprocessor 402. Thus, even though 16 pixels must be addressed at a time as each word in a bitplane is fetched, the shifter 81 allows movement of images on pixel boundaries. The amount of the shift for each of the sources is set by loading four bits into the Blitter control registers 63 for the A source and four bits for the B source.

The Blitter 67 can mask the left most and right most data word in the selected window from each horizontal line. Mask registers 83 and 85 are provided for the first and last words on every horizontal line of Blitter data for source A. This allows logic operations on bit boundaries from both the left and the right edge of a rectangular region. Only when there is a 1 bit loaded in the first word mask will that bit from the first word of source A be utilized in the logic operations performed by the Blitter. In a similar way, the last word mask 85 masks the right most word of the source A data. Thus, it is possible to perform operations on a rectangular block of data with left and right edges occurring between word boundaries. If the window is only one word wide, the first and last word masks overlap and bits from the source A word will be utilized only at bit positions where both masks contain ones.

The Blitter can sense whether any "1" bits are present as a result of a logic operation on source data. This feature can be used for hardware assisted detection of a collision between two images. The operation AB can be performed, and if the images A and B do not overlap, a zero flag will be set in a Blitter DMA status register. When the Blitter is doing only zero detection and not being used to generate a destination image, time and bus cycles can be saved by disabling the destination channel by not setting the appropriate bit in the Blitter control registers 63.

In addition to copying data, the Blitter 67 can simultaneously perform a fill operation during the copy. A restriction on the fill operation requires that the fill area be defined by first drawing untextured lines that contain only one pixel per horizontal line to set the boundaries for the fill. A special line draw mode executed by the Blitter can accomplish this line drawing operation. The Blitter can draw ordinary lines of any angle and can also apply a pattern to the lines it draws. A bit is set in the Blitter control registers 63 in order to indicate the Blitter is to operate in line draw mode. In order to ensure that the lines being drawn are one pixel wide, as required for a subsequent area fill, another bit must be set in the Blitter control register 63 to designate a single bit per horizontal line. The source A and source C are utilized in conjunction with the destination D Blitter DMA channels. The Blitter source A register 77 during line draw mode is preloaded with a 16 bit word containing 15 zeros and a single "1" as the most significant bit. This is the single bit which will be shifted into the correct position by the value in the A shift register 93 initially, then by the line-drawing hardware later in the process. The 16 bits in the B data register 77 are used to indicate the texture of the line and are preloaded with all ones to create the solid lines required if the fill mode will be executed subsequently. Four bits in a Blitter control register 63 are loaded with the bit position within the word at which the starting bit of the line occurs. Three bits in a Blitter control register 63 are loaded with a value that selects one of eight octants used for line drawing. The eight octants are used to divide a two dimensional Cartesian plane into eight regions to define the direction of the line for purposes of line drawing. The Blitter size register is used to control the line length and starts the line draw when data is written into it. Ten bits designate the height and allow for lines extending up to 1024 pixels, while six bits indicating the number of words in the width must always be set equal to two. The slope of the line is defined by loading the difference in bit position between the starting and ending points of the line in the A modulo register (horizontal change) and B modulo register (vertical change). The Blitter pointer register 138 for source A is used as an accumulator when in line mode. The pointer registers for the source C and destination D must be preloaded with the starting address of the first horizontal line. The modulo registers for the C source and D destination are both preloaded with the width of the screen into which the line is being drawn.

The Blitter control register 63 during a line draw mode is always loaded with the same logic function minterm select bits. The logic function selected Blitter operation during line draw mode is the moving into the destination of $\overline{A}$C+AB$\overline{C}$. The A source data register 77, as described above, is loaded with only a single bit in the data word, a one. Therefore, this operation on the display field (C) will leave most bits in the bitplanes unchanged, because for at least 15 of the 16 bits in each word, the destination will be loaded with the existing bit values in the C source data register 89 ($\overline{A}$C). If the line draw is to be followed by an area fill, untextured lines are required, so that the B source data register 79 contains only ones. Therefore, for the one bit per word in the A source register 77 that is a one, the bit value contained in the C source data register 89 will be inverted (AB$\overline{C}$). For each subsequent horizontal line, the Blitter hardware automatically moves the "1" to the correct position in the data words being stored in the A source data register 77. As a result, special lines with one pixel on each horizontal scan line can be drawn by the Blitter 67.

A fill operation can be performed during other Blitter data copy operations. Prior to the area fill, a Blitter line draw is first performed to provide two vertical lines, each one bit wide, on the display. The fill operation operates correctly only in the descending mode (from higher memory addresses to lower memory addresses). Only one source and the destination D is required. The pointers for the source and the destination in pointer registers 138 should be set to the same value, which will be the address of the last word of the enclosing rectangle of the window in RAM 401 since the operation is performed in a descending direction. The modulo registers for the source and destination are loaded with the difference between the number of words in a horizontal line of the rectangle to be filled and the number of words per horizontal line taken up in memory by the bitplanes. The Blitter size register is then loaded with 10 bits setting the number of vertical lines in the display window and 6 bits specifying the number of words in each horizontal line. Writing to the Blitter size register will start the operation of the Blitter. A Fill Carry In control bit is loaded into a Blitter control register 63 to indicate the starting fill state beginning at the right most edge (descending mode) of each line. If the Fill Carry In bit is set to a one, the area in the source area outside the lines is filled with ones and the area inside the lines is left with zeros. If the Fill Carry In bit is a zero, the area between the lines is filled with ones. The Blitter control register 63 also is loaded with bits indicating whether an inclusive fill or an exclusive fill is to be utilized. When the exclusive fill is enabled, the outline on the trailing edge of the fill (left side) is excluded from the resulting filled area. Enabling the exclusive fill mode is used to produce sharp, single pixel vertices.

Sprite objects are graphic objects that can be moved quickly on the screen, without moving their image location in memory. In contrast, bitmapped objects have a position on the display screen that is directly related to their location in RAM 401, and in order to move them, the object image stored in memory must be erased and rewritten in a different location. This can be very time consuming. The sprites used in the Amiga system are moved with extra hardware, such as horizontal position registers 343, vertical position registers 37, a horizontal position comparator 341, a vertical position comparator 39, and sprite data buffer registers 345. To move a sprite, the values stored in the position registers are simply changed. The vertical position circuits are located on the Agnus chip 410. The data buffers and the horizontal position circuits are located on the Denise chip 420.

The location of a sprite is defined by specifying the coordinates of its upper lefthand pixel. In the Amiga system, each sprite forms a rectangle on the display with a fixed width of 16 pixels (one data word) and a variable height. A sprite therefore consists of a series of 16 bit words in a contiguous memory area. To create a sprite data structure, the bits in the position registers 153 and 343 for that particular sprite (there are eight sprites available in all) are loaded with eight bits that specify the vertical start position and eight bits that specify the horizontal start position of the pixel at the upper left hand corner of the sprite. Next, eight bits in the vertical stop location register 155 for that particular sprite are loaded with the vertical stop position for the particular sprite (also referred to as a sprite control register). There is one position and one control register for each sprite, or a total of eight of each for the entire Amiga system. Each sprite also is associated with two data registers containing the bits defining the color registers utilized for each of 16 pixels on a particular horizontal line of the sprite. The two data registers for each sprite allow two bits to be used in defining the color register associated with any particular pixel in the sprite. Therefore, four possible registers are available. When both bits are set at zero for a particular pixel, this is interpreted as "transparent" and the color defined by the data associated with a playfield or sprite having a lower priority can be displayed. Any other binary number points to one of the three color registers assigned to that particular sprite DMA channel. The eight sprites use system color registers 17-19, 21-23, 25-27, and 29-31. For purposes of color selection, the eight sprites are organized into pairs and each pair uses one of three color registers or else selects the transparent mode. For each of the odd numbered sprites, the associated control register 37 contains a bit that can be set in order to attach an odd and an even numbered sprite to pair the data for both sprites in color interpretation. The two sprites will remain capable of independent motion. However, if their edges overlay one another at any particular pixel location, a greater selection of colors is possible because all four bits are then utilized in selecting one of 16 color registers.

The memory address for the data defining each sprite must be written into the proper pointer registers 138 during the vertical blanking interval before the first display of the sprite. Normally, the sprite pointer registers are loaded during the vertical blanking interval by the Copper 47. The values in the sprite pointer registers are dynamic and are incremented using the adder 137 and point first to the memory address containing the start data to be loaded into the position register, then the next address containing vertical stop data to be loaded into the sprite (vertical stop) control register 155, then the following addresses containing pairs of data words specifying the color selection information needed for each horizontal line of the sprite. After the data words describing the color selection in the last horizontal line in the sprite, two data words indicate the next usage of this sprite and comprise the start and stop data for reuse of the sprite. This last word pair contains all zeros if the particular sprite processor is to be used only once vertically in the display frame. During the vertical blanking interval, the sprite pointers must be rewritten into the pointer registers. The video beam counter 117 contains a count indicating the current location of the video beam that is producing the picture. The sprite vertical position comparator 39 and horizontal position comparator 341 compare the value of the beam counter to the value of the start position in the sprite position registers 153 and 343. Writing to the sprite position and control registers disables the horizontal comparator circuitry 341. This prevents the data registers 345 from sending any ouput to the serializers 347 and to the sprite bus 349. If the beam has reached the horizontal line on which the uppermost pixel of the sprite is to appear, the vertical position comparator 39 causes the sprite DMA controller 41 to have data registers 345 for that sprite loaded, which enables the horizontal comparator 341. This enables output by the serializers 369 for that sprite to the sprite bus when comparator 341 indicates the horizontal start position has been reached. Each of the 16 bits of a sprite data word is individually sent to the color select circuitry at the time that the pixel associated with that bit is being displayed on screen. Each parallel to serial converter 369 begins shifting the bits out of the converter, with the most significant bit first. The shift occurs once during each low resolution pixel time and continues until all 16 bits have been transferred to the sprite bus 349. The sprite bus goes to the priority circuitry 337 to establish the priority between sprites and playfields in selecting a color register. The sprite DMA channel examines the contents of the sprite position and control registers to determine how many lines of sprite data are to be fetched, with two data words fetched per each horizontal scan line occurs during a horizontal blanking interval. The fetch and store for each horizontal scan line occurs during a horizontal blanking interval. When the data words are fetched and written into the data registers, this arms the sprite horizontal comparators 341 and allows them to start the output of the sprite data to he screen as soon as the horizontal beam count value matches the value stored in the sprite horizontal position register 343. When the vertical position of the beam counter is equal to the vertical stop value contained in the sprite control register, the next two words addressed by the sprite pointer registers and fetched from memory will be written into the sprite position and control registers instead of being sent to the data registers 345. These words are interpreted by the hardware in exactly the same manner as the original words first loaded into the position and control registers. By loading the position register with a vertical starting position that is higher than the current beam position, the sprite can be reused during the same display field.

A sprite generated in the manner described above can be moved by simply changing the vertical and horizontal starting position and vertical stopping position loaded into the sprite position and control registers. If this position data is changed before the sprite is redrawn, the sprite will appear in a new position and will appear to be moving. Usually, the vertical blanking period is the best time to change the position of the sprite. Each sprite DMA channel can be reused several times within the same display field. The only restriction on reuse of a sprite at a lower vertical position on the display screen is that the last line of the prior usage of a sprite must be separated by at least one horizontal scan line from the top line of the next usage of the sprite. This restriction is necessary because the time during this horizontal scan line is needed to fetch the position and control words defining the next usage of the sprite. As sprites move on the display screen, they can collide with each other or with either of the two playfields. The Amiga system contains special collision detection logic 335 to create special effects or to keep a moving object within specific onscreen boundaries. Built in sprite video priority ensures that one sprite appears to be behind the other when sprites are overlapped. The priority circuitry 337 gives the lowest numbered sprite the highest priority and the highest numbered sprite the lowest priority. Therefore, when two sprites overlap, the image defined by the data for the lower numbered sprite will be displayed except for pixel positions that are designated as being transparent, in which case the lower priority sprite data can be used to generate an image.

The priorities of various objects on the display can be controlled to give the illusion of three dimensions. For playfield priority and collision purposes only, sprites are treated as four groups of two sprites each. The relative priority of the sprites to each other cannot be changed. They will always appear on the screen with the lower numbered sprites appearing in front of (having higher screen priority than) the higher numbered sprites. This priority is wired into the display priority control logic 337 In the bitplane priority registers 355, seven bits can be loaded that will control the relative video priorities of playfield 1, playfield 2, and the four pairs of sprites. Three bits are utilized to determine the relative priority of playfield 1 with respect to the four pairs of sprites. Similarly, three more bits are utilized to establish the priority between playfield 2 and four pairs of sprites. However, one more bit is utilized to determine which of the two playfields has higher priority than the other. This allows for unusual visual affects on the screen. Thus, it is possible to have sprites appear in front of playfield 1 but disappear behind playfield 2 while playfield 2, in turn, has lower priority than playfield 1 and is not visible behind it.

The collision control register 351 contains the bits that define certain characteristics of collision detection. Collisions are detected when two or more objects attempt to overlap in the same pixel position. This will set a bit in the collision data storage register 353 if the collision control register indicates that particular overlap will cause a collision. Fifteen bits in the collision storage register are utilized to indicate whether any of several types of overlaps has occurred: e.g., one sprite to another sprite, even bitplanes to odd bitplanes, even bitplanes to a certain sprite, or odd bitplanes to a certain sprite. The collision control register contains bits that specify whether to include or exclude the odd-numbered sprites or specific bitplanes from collision detection. Furthermore, other bits specify the true-false condition of the bits in each bitplane that will cause a collision. Thus, it is possible to register collisions only when an object collides with something of a particular color.

The above description of the invention is intended to be illustrative of a single preferred embodiment. Changes can be made to the structures described herein without departing from the features and scope of the invention.

What is claimed is:

1. A personal computer system to provide video output signals to a raster display, wherein an image consisting of a plurality of pixels if assembled on a screen of the raster display by an electron beam scanning the screen, and wherein the visual characteristics of a pixel being scanned by the electron beam are determined by the video output signals provided by the personal computer system when the pixel is being scanned, and wherein the personal computer system comprises:

central processor means for executing program instructions;

memory means including a plurality of addresses for storing bit-mapped image data, wherein the visual characteristics of a pixel are defined by bit-mapped image data stored in at least one address corresponding to the pixel;

data bus means coupled to the processor means and the memory means for transferring data;

address bus means coupled to the processor means and the memory means for transferring an address to the memory means;

pointer means, coupled to the address bus means, for selecting a plurality of source addresses in the memory means as a plurality of sources of unprocessed bit-mapped image data to be transferred on the data bus means, and for selecting a destination address in the memory means as a destination of processed bit-mapped image data to be transferred on the data bus means;

blitter means, coupled to the data bus means, for transferring a block of bit-mapped image data between the blitter means and the memory means, and for processing the block of bit-mapped image data, wherein the blitter means includes:

means for receiving from the data bus means unprocessed bit-mapped image data stored in the memory means at the plurality of source addresses;

logic means, for executing a logical operation on unprocessed bit-mapped image data simultaneously input from the receiving means for each of the plurality of source addresses, to generate processed bit-mapped image data; and means for providing the processed bit-mapped image data to the data bus means for storage in the memory means at the destination address; and image display means, for receiving bit-mapped image data stored in at least one address corresponding to a pixel, and for generating the video output signals determining the visual characteristics of the pixel.

2. A personal computer system in accordance with claim 1, in which the pointer means selects a first address, a second address, and a third address in the memory means as a first source, a second source, and a third source of unprocessed bit-mapped image data to be transferred on the data bus means.

3. A personal computer system in accordance with claim 2, in which the image display means generates video output signals comprising RGB color signals.

4. A personal computer system in accordance with claim 2, and further comprising blitter DMA controller means for generating a blitter DMA request to prevent data from being transferred between the data bus means and the central processor means at times when bit-mapped image data is transferred between the blitter means and the memory means.

5. A personal computer system in accordance with claim 2, wherein the image is assembled on the screen by the electron beam scanning a plurality of horizontal lines, and wherein the personal computer system further comprises:

size means for designating the width of a window of bit-mapped image data being processed by the blitter means, wherein the window width is the number of addresses corresponding to each horizontal line of the window; and modulo register means coupled to the pointer means for storing a modulo amount, wherein the modulo amount corresponds to the difference between the window width number and the number of addresses corresponding to each horizontal line of the image for at least one of the plurality of source addresses and the destination address; and wherein the pointer means selects a first address corresponding to one horizontal line of the window, for at least one of the plurality of source addresses and the destination address, by adding the modulo amount to a last address corresponding to another horizontal line of the window.

6. A personal computer system in accordance with claim 5, wherein the receiving means receives a multibit data word of unprocessed bit-mapped image data from the data bus means for at least one of the plurality of source addresses, and further comprising:

mask means, coupled between the receiving means and the logic means, for masking a selected number of bits in the received multibit data word for at least one of the plurality of source addresses.

7. A personal computer system in accordance with claim 2, in which the blitter means further comprises shift means for executing a shift operation on bit-mapped image data from at least one of the three source addresses.

8. A personal computer system in accordance with claim 7, in which the blitter means further comprises shift count means for selecting a shift count that determines the size of the shift to be executed on bit-mapped image data from at least one of the three source addresses, and in which the shift means executes the selected shift count.

9. A personal computer system in accordance with claim 2, in which the blitter means further comprises means for selecting one of a plurality of logical operations, and in which the logic means executes the selected logical operation.

10. A personal computer system in accordance with claim 9, in which the means for selecting one of a plurality of logical operations selects one of 256 possible logical operations.

11. A personal computer system in accordance with claim 9, in which the blitter means further comprises shift means for executing a shift operation on bit-mapped image data from at least one of the three source addresses.

12. A personal computer system in accordance with claim 9, wherein the image includes a background and an object on the background having an outline, and wherein the object is animated with respect to the background, in which:

the memory means includes at least one address A for storing data defining the outline of the object, at least one address C for storing bit-mapped image data defining the visual characteristics of the image, at least one address B for storing bit-mapped image data defining the visual characteristics of the object, and at least one address T for storing bit-mapped image data defining the visual characteristics of at least the portion of the background covered by the object;

the pointing means selects address A as a first source, address C as the second source, and address T as a destination at a first time, selects address A as a first source, address B as a second source, address C as a third source, and address C as a destination at a second time, and selects address as a first source, address T as a second source, and address C as a destination at a third time; and the selecting means selects a logical operation at the first time that stores at address T at least the portion of the background to be covered by the object, selects a logical operation at the second time that stores at address C bit-mapped image data defining the visual characteristics of the object if the outline of the object is present at address C and that saves at address C bit-mapped image data defining the visual characteristics of the background if the outline of the object is not present at address C, and selects a logical operation at the third time that stores at address C bit-mapped image data defining the visual characteristics of at least the portion of the background to be covered by the object.

13. A personal computer system in accordance with claim 12, in which the blitter means further comprises shift means for executing a shift operation on bit-mapped image data from at least one of the plurality of source addresses.

14. A personal computer system in accordance with claim 1, in which the blitter means further comprises means for selecting one of a plurality of logical operations, and in which the logic means executes the selected logical operation.

15. A personal computer system in accordance with claim 14, and further comprising blitter DMA controller means for generating a blitter DMA request to prevent data from being transferred between the data bus means and the central processor means at times when bit-mapped image data is transferred between the blitter means and the memory means.

16. A personal computer system in accordance with claim 14, wherein the image is assembled on the screen by the electron beam scanning a plurality of horizontal lines, and wherein the personal computer system further comprises:

size means for designating the width of a window of bit-mapped image data being processed by the blitter means, wherein the window width is the number of addresses corresponding to each horizontal line of the window; and modulo register means coupled to the pointer means for storing a modulo amount, wherein the modulo amount corresponds to the difference between the window width number and the number of addresses corresponding to each horizontal line of the image for at least one of the plurality of source addresses and the destination address; and wherein the pointer means selects a first address corresponding to one horizontal line of the window, for at least one of the plurality of source addresses and the destination address, by adding the modulo amount to a last address corresponding to another horizontal line of the window.

17. A personal computer system in accordance with claim 14, wherein the receiving means receives a multibit data word of unprocessed bit-mapped data from the data bus means for at least one of the plurality of source addresses, and further comprising:

mask means, coupled between the receiving means and the logic means, for masking a selected number of bits in the received multi-bit data word for at least one of the plurality of source addresses.

18. A personal computer system in accordance with claim 14, in which the blitter means further comprises shift means for executing a shift operation on bit-mapped image data from at least one of the plurality of source addresses.

19. A personal computer system in accordance with claim 18, in which the blitter means further comprises shift count means for selecting a shift count that determines the size of the shift to be executed on bit-mapped image data from at least one of the plurality of source addresses, and in which the shift means executes the selected shift count.

20. A personal computer system in accordance with claim 1, in which the blitter means further comprises shift means for executing a shift operation on bit-mapped image data from at least one of the plurality of source addresses.

21. A personal computer system in accordance with claim 20, in which the blitter means further comprises shift count means for selecting a shift count that determines the size of the shift to be executed on bit-mapped image data from at least one of the plurality of source addresses, and in which the shift means executes the selected shift count.

22. A personal computer system in accordance with claim 20, and further comprising blitter DMA controller means for generating a blitter DMA request to prevent data from being transferred between the data bus means and the central processor means at times when bit-mapped image data is transferred between the blitter means and the memory means.

23. A personal computer system in accordance with claim 20, wherein the receiving means receives a multibit data word of unprocessed bit-mapped image data from the data bus means for at least one of the plurality of source addresses, and further comprising:

mask means, coupled between the receiving means and the logic means, for masking a selected number of bits in the received multibit data word for at least one of the plurality of source addresses.

24. A personal computer system in accordance with claim 1, and further comprising blitter DMA controller means for generating a blitter DMA request to prevent data from being transferred between the data bus means and the central processor means at times when bit-mapped image data is transferred between the blitter means and the memory means.

25. A personal system in accordance with claim 24, wherein the image is assembled on the screen by the electron beam scanning a plurality of horizontal lines, and wherein the personal computer system further comprises:

size means for designating the width of a window of bit-mapped image data being processed by the blitter means, wherein the window width is the number of addresses corresponding to each horizontal line of the window; and modulo register means coupled to the pointer means for storing a modulo amount, wherein the modulo amount corresponds to the difference between the window width number and the number of addresses corresponding to each horizontal line of the image for at least one of the plurality of source addresses and the destination address; and wherein the pointer means selects a first address corresponding to one horizontal line of the window, for at least one of the plurality of source addresses and the destination address, by adding the modulo amount to a last address corresponding to another horizontal line of the window.

26. A personal computer system in accordance with claim 24, wherein the receiving means receives a multibit data word of unprocessed bit-mapped data from the data bus means for at least one of the plurality of source addresses, and further comprising:

mask means, coupled between the receiving means and the logic means, for masking a selected number of bits in the received multibit data word for at least one of the plurality of source addresses.

27. A personal computer system in accordance with claim 1, in which the image display means generates video output signals comprising RGB color signals.

28. A personal computer system in accordance with claim 1, wherein the image is assembled on the screen by the electron beam scanning a plurality of horizontal lines, and wherein the personal computer system further comprises:

size means for designating the width of a window of bit-mapped image data being processed by the blitter means, wherein the window width is the number of addresses corresponding to each horizontal line of the window; and modulo register means coupled to the pointer means for storing a modulo amount, wherein the modulo amount corresponds to the difference between the window width number and the number of addresses corresponding to each horizontal line of the image for at least one of the plurality of source addresses and the destination address; and wherein the pointer means selects a first address corresponding to one horizontal line of the window, for at least one of the plurality of source addresses and the destination address, by adding the modulo amount to a last address corresponding to another horizontal line of the window.

29. A personal computer system in accordance with claim 28, wherein the receiving means receives a multibit data word of unprocessed bit-mapped image data from the data bus means for at least one of the plurality of source addresses, and further comprising:

mask means, coupled between the receiving means and the logic means, for masking a selected number of bits in the received multibit data word for at least one of the plurality of source addresses.

30. A personal computer system to provide video output signals to a raster display, wherein an image consisting of a plurality of pixels is assembled on a screen of the raster display by an electron beam scanning the screen, wherein the visual characteristics of a pixel being scanned by the electron beam are determined by the video output signals provided by the personal computer system when the pixel is being scanned, and wherein the image includes a region bounded by two vertical lines, and wherein the personal computer system comprises:

central processor means for executing program instructions;

memory means including a plurality of addresses for storing bit-mapped image data, wherein the visual characteristics of a pixel are defined by bit-mapped image data stored in at least one address corresponding to the pixel;

data bus means coupled to the processor means and the memory means for transferring data;

address bus means coupled to the processor means and the memory means for transferring an address to the memory means;

pointer means, coupled to the address bus means, for selecting a source address in the memory means as a source of unprocessed bit-mapped image data to be transferred on the data bus means, and for selecting a destination address in the memory means as a destination of processed bit-mapped image data to be transferred on the data bus means;

blitter means, coupled to the data bus means, for transferring a block of bit-mapped image data between the blitter means and the memory means, and for processing the block of bit-mapped image data, wherein the blitter means includes:

means for receiving from the data bus means unprocessed bit-mapped image data stored in the memory means at the source address;

logic means, for executing a logical operation on unprocessed bit-mapped image data to generate processes bit-mapped image data, wherein the logic means includes fill logic means, for detecting bit-mapped image data corresponding to each of the two vertical lines during processing of bit-mapped image data corresponding to one horizontal line of the image, and for changing bit-mapped image data corresponding to the region of the one horizontal line bounded by the two vertical lines in order to fill the bounded region; and means for providing the processed bit-mapped image data to the data bus means for storage in the memory means at the destination address; and image display means, for receiving bit-mapped image data stored in at least one address corresponding to a pixel, and for generating the video output signals.

31. A personal computer system in accordance with claim 30, in which the blitter means further comprises shift means for executing as shift operation on bit-mapped image data from the source address.

32. A personal computer system in accordance with claim 30, and further comprising blitter DMA controller means for generating a blitter DMA request to prevent data from being transferred between the data bus means and the central processor means at times when bit-mapped image data is transferred between the blitter means and the memory means.

* * * * *

(12) EX PARTE REEXAMINATION CERTIFICATE (6059th)
United States Patent
Miner et al.

(10) Number: US 4,874,164 C1
(45) Certificate Issued: Dec. 25, 2007

(54) PERSONAL COMPUTER APPARATUS FOR BLOCK TRANSFER OF BIT-MAPPED IMAGE DATA

(75) Inventors: Jay G. Miner, Mtn. View, CA (US); Dave Dean, Ukiah, CA (US); Joseph C. Decuir, Albany, CA (US); Ronald H. Nicholson, Sunnyvale, CA (US); Akio Tanaka, Burlingame, CA (US)

(73) Assignee: AD Technologies LLC, North Sioux City, SD (US)

Reexamination Request:
No. 90/007,667, Aug. 12, 2005

Reexamination Certificate for:
Patent No.: 4,874,164
Issued: Oct. 17, 1989
Appl. No.: 06/886,796
Filed: Jul. 18, 1986

(51) Int. Cl.
*G09G 5/37* (2006.01)
*G09G 5/39* (2006.01)
*G09G 5/36* (2006.01)
*A63F 13/00* (2006.01)

(52) U.S. Cl. .................. 345/562; 345/545; 345/564
(58) Field of Classification Search ................. 345/562, 345/545, 564
See application file for complete search history.

(56) References Cited

U.S. PATENT DOCUMENTS

| | | |
|---|---|---|
| 3,955,212 A | 5/1976 | Engel et al. |
| 4,180,855 A | 12/1979 | Buedel |
| 4,243,984 A | 1/1981 | Ackley et al. |
| RE31,200 E | 4/1983 | Sukonick et al. |
| 4,535,420 A | 8/1985 | Fung |
| 4,555,775 A | 11/1985 | Pike |

OTHER PUBLICATIONS

Pike, R. "Graphics in Overlapping Bitmap Layers," Computer Graphics, vol. 17, No. 3 (1983).

Foley & Van Dam, Fundamentals of Interactive Computer Graphics (1982), Addison–Wesley Publishing Company, United States.

*Primary Examiner*—Albert Gagliardi

(57) ABSTRACT

A computer that provides data to a video display using a bitmap display memory organization and bitplane addressing. Separate control is provided for two bit-plane backgrounds and for eight reusable and easily movable sprites. Additional logic allows for dynamically-controllable inter-object priority and collision detection among data in each of the bitplane backgrounds and sprites. A coprocessor provides for video beam-synchronized changes to data in registers, freeing the main processor for general purpose computing tasks. A block image transfer is provided to rapidly copy data in large blocks from one memory location to another. In hold-and-modify mode, color output circuitry holds the value for a previously displayed pixel while bitplane data modifies those values, allowing for simultaneous display of a greatly increased number of colors.

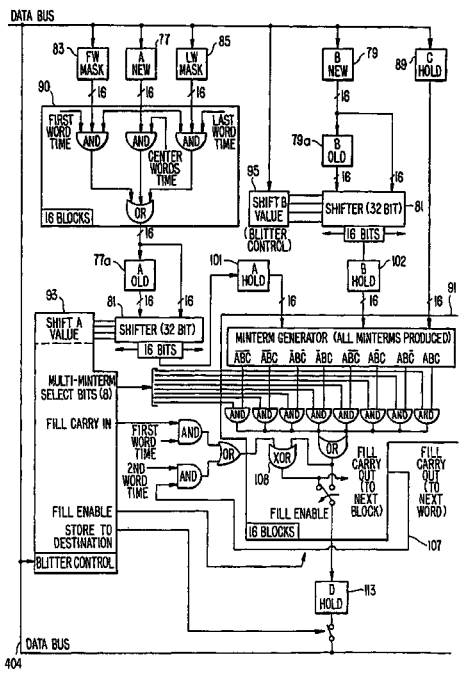

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–32 is confirmed.

* * * * *